US011880426B2

(12) United States Patent
Simpson

(10) Patent No.: US 11,880,426 B2
(45) **Date of Patent: *Jan. 23, 2024**

(54) INTEGER MATRIX MULTIPLICATION ENGINE USING PIPELINING

(71) Applicant: Wave Computing, Inc., San Jose, CA (US)

(72) Inventor: David John Simpson, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,011

(22) Filed: Jul. 31, 2022

(65) Prior Publication Data

US 2022/0366010 A1 Nov. 17, 2022

Related U.S. Application Data

(63) Continuation of application No. 16/943,252, filed on Jul. 30, 2020, now Pat. No. 11,481,472, which is a continuation-in-part of application No. 16/835,812, filed on Mar. 31, 2020, now Pat. No. 11,227,030.

(60) Provisional application No. 62/907,907, filed on Sep. 30, 2019, provisional application No. 62/898,770, filed on Sep. 11, 2019, provisional application No. 62/898,114, filed on Sep. 10, 2019, provisional application No. 62/893,970, filed on Aug. 30, 2019, provisional application No. 62/894,002, filed on Aug. 30, 2019, provisional application No. 62/887,722, filed on Aug. 16, 2019, provisional application No. 62/887,713, filed on Aug. 16, 2019, provisional application No. 62/882,175, filed on Aug. 2, 2019, provisional application No. 62/874,022, filed on Jul. 15, 2019, provisional application No. 62/857,925, filed on Jun. 6, 2019, provisional application No. 62/856,490, filed on Jun. 3, 2019, provisional application No. 62/850,059, filed on May 20, 2019, provisional application No. 62/827,333, filed on Apr. 1, 2019.

(51) Int. Cl.
*G06F 17/16* (2006.01)
*G06F 7/16* (2006.01)

(52) U.S. Cl.
CPC .................................... *G06F 7/16* (2013.01)

(58) Field of Classification Search
CPC ..................................................... G06F 17/16
USPC ........................................................ 708/607
See application file for complete search history.

(56) References Cited

U.S. PATENT DOCUMENTS 11,481,472 B2 * 10/2022 Simpson ................ G06F 17/16

* cited by examiner

*Primary Examiner* — Tan V Mai

(57) ABSTRACT

Techniques for data manipulation using integer matrix multiplication using pipelining are disclosed. A first integer matrix with dimensions m×k and a second integer matrix with dimensions k×n are obtained for matrix multiplication within a processor. The first and second integer matrices employ a two's complement variable radix point data representation. The first and second integer matrices are distilled into (j×j) submatrices. A first variable radix point format and an initial value for an accumulator register are configured dynamically. A first variable radix point format is configured dynamically for the first integer matrix and a second variable radix point format is configured dynamically for the second integer matrix. Multiply-accumulate operations are executed in a pipelined fashion on the (j×j) submatrices of the first integer matrix and the second integer matrix, where a third variable radix point format is configured for the result.

20 Claims, 13 Drawing Sheets

300

| FORMAT | MIN | MAX | INTERVAL |
|---|---|---|---|
| Q0.4 | 0 | +0.9375 | 0.0625 |
| Q1.3 | -1.0 | +0.875 | 0.125 |
| Q2.2 | -2.0 | +1.75 | 0.25 |
| Q3.1 | -4.0 | +3.5 | 0.5 |
| Q4.0 | -8.0 | +7.0 | 1 |

| FORMAT | MIN | MAX | INTERVAL |
|---|---|---|---|
| Q0.8 | 0 | +0.99609375 | 0.00390625 |
| Q1.7 | -1.0 | +0.9921875 | 0.0078125 |
| Q2.6 | -2.0 | +1.984375 | 0.015625 |
| Q3.5 | -4.0 | +3.96875 | 0.03125 |
| Q4.4 | -8.0 | +7.9375 | 0.0625 |
| Q5.3 | -16.0 | +15.875 | 0.125 |
| Q6.2 | -32.0 | +31.75 | 0.25 |
| Q7.1 | -64.0 | +63.5 | 0.5 |
| Q8.0 | -128.0 | +127.0 | 1 |

$$\begin{bmatrix} a & b & c \\ d & e & f \\ g & h & i \\ j & k & l \end{bmatrix} \times \begin{bmatrix} m & n & o \\ p & q & r \\ s & t & u \end{bmatrix} = \begin{bmatrix} am + bp + cs & an + bq + ct & ao + br + cu \\ dm + ep + fs & dn + eq + ft & do + er + fu \\ gm + hp + is & gn + hq + it & go + hr + iu \\ jm + kp + ls & jn + kq + lt & jo + kr + lu \end{bmatrix}$$

| 730 | A-INPUTS (710) | B-INPUTS (712) | MAC0 (720) | MAC1 (722) | MAC2 (724) | D-OUTPUTS (740) |
|---|---|---|---|---|---|---|
| 0 | --- | m,0 | --- | --- | --- | |
| 1 | --- | n,1 | --- | --- | --- | |
| 2 | a | o,2 | am | --- | --- | |
| 3 | d | . | dm | an | --- | |
| 4 | g | p,0 | gm | dn | ao | |
| 5 | j | q,1 | jm | gn | do | |
| 6 | b | r,2 | bp+am | jn | go | |
| 7 | e | . | ep+dm | bq+an | jo | |
| 8 | h | s,0 | hp+gm | eq+dn | br+ao | |
| 9 | k | t,1 | kp+jm | hq+gn | er+do | |
| 10 | c | u,2 | cs+(bp+am) | kq+jn | hr+go | |
| 11 | f | . | fs+(ep+dm) | ct+(bq+an) | kr+jo | |
| 12 | i | M,0 | is+(hp+gm) | ft+(eq+dn) | cu+(br+ao) | |
| 13 | l | N,1 | ls+(kp+jm) | it+(hq+gn) | fu+(er+do) | |
| 14 | A | O,2 | AM | lt+(kq+jn) | iu+(hr+go) | cs+(bp+am) |
| 15 | D | . | DM | AN | lu+(kr+jo) | fs+(ep+dm) |
| 16 | G | P,0 | GM | DN | AO | is+(hp+gm) |
| 17 | J | Q,1 | JM | GN | DO | ls+(kp+jm) |
| 18 | B | R,2 | BP+AM | JN | GO | ct+(bq+an) |
| 19 | E | . | EP+DM | BQ+AN | JO | ft+(eq+dn) |
| 20 | H | S,0 | HP+GM | EQ+DN | BR+AO | it+(hq+gn) |
| 21 | K | T,1 | KP+JM | HQ+GN | ER+DO | lt+(kq+jn) |
| 22 | C | U,2 | CS+(BP+AM) | KQ+JN | HR+GO | cu+(br+ao) |
| 23 | F | . | FS+(EP+DM) | CT+(BQ+AN) | KR+JO | fu+(er+do) |
| 24 | I | --- | IS+(HP+GM) | FT+(EQ+DN) | CU+(BR+AO) | iu+(hr+go) |
| 25 | L | --- | LS+(KP+JM) | IT+(HQ+GN) | FU+(ER+DO) | lu+(kr+jo) |
| 26 | --- | --- | --- | LT+(KQ+JN) | IU+(HR+GO) | CS+(BP+AM) |
| 27 | --- | --- | --- | --- | LU+(KR+JO) | FS+(EP+DM) |
| 28 | --- | --- | --- | --- | --- | IS+(HP+GM) |

FIG. 7

INTEGER MATRIX MULTIPLICATION ENGINE USING PIPELINING

RELATED APPLICATIONS

This application is a continuation of, and claims the benefit of, U.S. patent application Ser. No. 16/943,252, filed 30 Jul. 2020, which claims the benefit of U.S. provisional patent applications "Integer Multiplication Engine Using Pipelining" Ser. No. 62/882,175, filed Aug. 2, 2019, "Multidimensional Address Generation for Direct Memory Access" Ser. No. 62/887,713, filed Aug. 16, 2019, "Processor Cluster Dispatch Engine with Dynamic Scheduling" Ser. No. 62/887,722, filed Aug. 16, 2019, "Data Flow Graph Computation Using Barriers" Ser. No. 62/893,970, filed Aug. 30, 2019, "Data Flow Graph Computation with Barrier Counters" Ser. No. 62/894,002, filed Aug. 30, 2019, "Distributed Dispatch Engine for Use with Heterogeneous Accelerators" Ser. No. 62/898,114, filed Sep. 10, 2019, "Data Flow Processing Dispatch Graph Compilation" Ser. No. 62/898,770, filed Sep. 11, 2019, and "Processor Cluster Address Generation" Ser. No. 62/907,907, filed Sep. 30, 2019.

U.S. patent application Ser. No. 16/943,252, filed 30 Jul. 2020 and to which this application claims the benefit of as a continuation, is also a continuation-in-part of U.S. patent application "Matrix Multiplication Engine Using Pipelining" Ser. No. 16/835,812, filed Mar. 31, 2020, which claims the benefit of U.S. provisional patent applications "Matrix Multiplication Engine Using Pipelining" Ser. No. 62/827,333, filed Apr. 1, 2019, "Dispatch Engine with Queuing and Scheduling" Ser. No. 62/850,059, filed May 20, 2019, "Artificial Intelligence Processing Using Reconfiguration and Tensors" Ser. No. 62/856,490, filed Jun. 3, 2019, "Dispatch Engine with Interrupt Processing" Ser. No. 62/857,925, filed Jun. 6, 2019, "Data Flow Graph Computation Using Barriers with Dispatch Engines" Ser. No. 62/874,022, filed Jul. 15, 2019, "Integer Multiplication Engine Using Pipelining" Ser. No. 62/882,175, filed Aug. 2, 2019, "Multidimensional Address Generation for Direct Memory Access" Ser. No. 62/887,713, filed Aug. 16, 2019, "Processor Cluster Dispatch Engine with Dynamic Scheduling" Ser. No. 62/887,722, filed Aug. 16, 2019, "Data Flow Graph Computation Using Barriers" Ser. No. 62/893,970, filed Aug. 30, 2019, "Data Flow Graph Computation with Barrier Counters" Ser. No. 62/894,002, filed Aug. 30, 2019, "Distributed Dispatch Engine for Use with Heterogeneous Accelerators" Ser. No. 62/898,114, filed Sep. 10, 2019, "Data Flow Processing Dispatch Graph Compilation" Ser. No. 62/898,770, filed Sep. 11, 2019, and "Processor Cluster Address Generation" Ser. No. 62/907,907, filed Sep. 30, 2019.

Each of the foregoing applications is hereby incorporated by reference in its entirety.

FIELD OF ART

This application relates generally to data manipulation and more particularly to an integer matrix multiplication engine using pipelining.

BACKGROUND

The collection of data has become ubiquitous and is often anonymous. The data is collected while people are interacting with their electronic devices, engaging with others in public spaces, or even while residing within their homes. An individual may be using her smartphone to peruse world news, while another person is using his tablet to monitor his dog at home. Metadata related to the usage of devices is collected, irrespective of the interaction with the device. Data and metadata include details such as websites visited, products and services searched or viewed, menu items selected, and radio buttons clicked. The data is collected and analyzed. The analysis results are used to push content, products, or services which are predicted to have the highest match to user interests. Businesspeople, researchers, and governments aggregate the collected data into datasets, or "big data", for analysis. The immensity of big data datasets saturates the capabilities of traditional processors and analysis techniques. Other data handling demands further complicate the computational and processing requirements. The collected data would have little or no value to any stakeholders without viable and scalable data analysis and handling techniques.

Big data analysis necessitates innovative computing architectures and software techniques. Dataset owners or users have economic and intellectual interests in analyzing the data, including business analysis; disease or infection detection, tracking, and control; crime detection and prevention; meteorology; and complex scientific and engineering simulations; among many others. Advanced data analysis techniques are applied to predictive analytics, which can be used to show consumers what they want, even before the consumers know that they want it. Machine learning and deep learning techniques are also applied to support the data analysis. Machine learning can be performed on a network such as a neural network. The neural network can process the big data datasets so that the neural network can learn. The better the data, the better the outcome of the machine learning. The processors on which the machine learning techniques can be executed are designed to efficiently handle the flow of data. These processors, which are based on data flow architectures, process data when valid data becomes available. This allows for helpful simplifications and in some cases avoids a need for a global system clock.

Computing architectures based on reconfigurable hardware are highly flexible and are particularly well suited to processing large data sets, performing complex computations, and executing other computationally resource-intensive applications. Reconfigurable computing integrates the key advantages drawn from hardware and software techniques. A reconfigurable computing architecture can be "recoded" (reprogrammed) to suit a processing need. The recoding adapts or configures the high-performance hardware architecture, much like recoding software. A reconfigurable fabric hardware technique is directly applicable to reconfigurable computing. Reconfigurable fabrics may be arranged in topologies or configurations for the many applications that require high performance computing. Applications such as processing of big data; digital signal processing (DSP); machine learning based on neural networks, matrix or tensor computations; vector operations; Boolean manipulations; and so on, can be implemented within a reconfigurable fabric. The reconfigurable fabric operates particularly well when the data includes specific types of data, large quantities of unstructured data, sample data, training data, and the like. The reconfigurable fabrics can be coded or scheduled to achieve these and other processing techniques, and to represent a variety of efficient computer architectures.

SUMMARY

The processing of vast quantities of data such as unstructured data is applicable to a wide range of business, scientific, research, and other fields. The data, which is collected into large datasets or "big data", is processed for applications in areas such as artificial intelligence, trend analysis, business analytics, machine learning (including deep learning), medical research, law enforcement, public safety, and so on. Traditional processors and processing techniques for data analysis fall far short of the voluminous data handling requirements. Data analysis systems designers and engineers have tried to meet the processing requirements by building or purchasing faster processors, designing custom integrated circuits (chips), implementing application specific integrated circuits (ASICs), programming field programmable gate arrays (FPGAs), etc. These approaches are based on computer and chip architectures, such as Von Neumann architectures, which are focused on how control of the chip operations (control flow view) is performed. Alternatively, the flow of data (data flow view) can be considered. In a data flow architecture, the execution of instructions, functions, subroutines, kernels, agents, apps, etc. is based on the presence or absence of valid data which is available to a processor. This latter approach, that of a data flow architecture, is far better suited to the tasks of handling the large amounts of unstructured data that is processed as part of the machine learning and deep learning applications. The data flow architecture obviates the need for centralized control of the processing since no system clocks or centralized control signals are required. A data flow architecture can be implemented using a reconfigurable fabric.

Data manipulation is based on integer matrix multiplication using pipelining. A processor-implemented method for data manipulation is disclosed comprising: obtaining a first integer matrix with dimensions m×k and a second integer matrix with dimensions k×n for matrix multiplication within a processor, wherein the first integer matrix and the second integer matrix employ a two's complement variable radix point data representation; distilling the first integer matrix and the second integer matrix into (j×j) submatrices; configuring dynamically both a variable radix point format and an initial value for an accumulator register; and executing multiply-accumulate operations in a pipelined fashion on the (j×j) submatrices of the first integer matrix and the second integer matrix, wherein a third variable radix point format is configured for the result. The method further comprises outputting the results of the matrix multiplication to a storage element, wherein the outputting takes an additional (m×k) cycles. In embodiments, the first variable radix point format and the second variable radix point format comprise a 16-bit data type. The variable radix point can be placed to the left of, amid, or to the right of the 16-bits of the data type. The choice of placement for the radix point determines how many bits are included in the integer part and how many bits are included in the fractional part. The placement of the radix point further determines the minimum and maximum numbers that can be represented by the 16 bits, and also determines the interval between numbers within the range of numbers. The data type used can include a 4-bit data type, an 8-bit data type, and so on. The multiply-accumulate operations can be applied to tensor operations.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 3 shows dynamic radix point ranges for 4-bit numbers.

FIG. 4 illustrates dynamic radix point ranges for 8-bit numbers.

FIG. 5 shows matrix multiplication.

FIG. 7 shows pipelined matrix multiply results.

DETAILED DESCRIPTION

Figure 1:
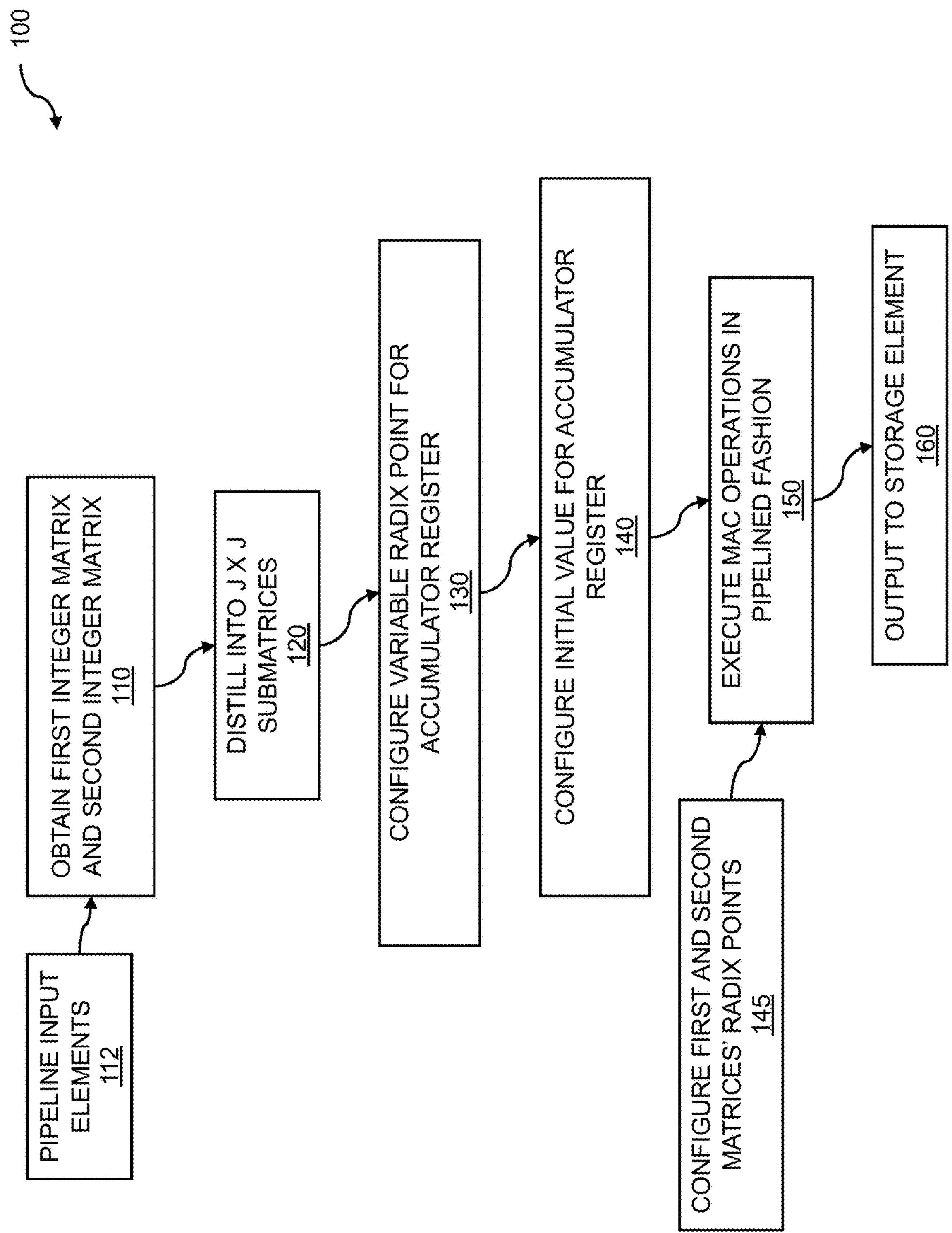
FIG. 1 is a flow diagram for an integer matrix multiplication engine using pipelining.

Techniques for data manipulation-based integer matrix multiplication using pipelining are disclosed. The matrix multiplication engine can include one or more multiply-accumulate (MAC) units, where the MAC units can be based on one or more processor and memory subsystems. The processor and memory subsystem can be allocated as part of one or more clusters within a reconfigurable fabric to implement one or more MAC units. The elements within the reconfigurable fabric can include processing elements, switching elements, or storage elements. Further hardware resources can include hardware resources that enable distilling submatrices from matrices. The submatrices can include square matrices. The hardware resources can also include configuring dynamically variable radix point formats. The variable radix point formats can be used to determine minimum and maximum numbers that can be represented by the format, the interval between values that can be represented, etc. The hardware resources can include handling one or more pipelines, and the like. Matrix multiplication can be based on arithmetic operations including multiplication and addition, vector or tensor operations, and so on. The MAC units can perform other operations such as tracking availability of data or validity of data, determining status of a pipeline such as "full" or "empty", completing a multiply-accumulate operation, and the like The matrix multiplication engine can include one or more processors. A processor can include a CPU or GPU, programmable logic, application-specific integrated circuits (ASICs), arithmetic processors, and the like. The processor can include clusters of elements within a reconfigurable computing environment. The matrix multiplication engine can access various types of storage. The storage can include small, fast memory and large, slow memory. The memory can include DMA memory, remote DMA (RDMA) memory, high performance memory, etc. While the disclosed techniques can address matrix multiplication, the techniques can further be applied to processing tasks that operate on data by using functions, algorithms, heuristics, apps, etc. The processing of data for data manipulation can be used to process large datasets. The large amounts of data, or "big data", saturate conventional, control-based computer hardware techniques such as Von Neumann techniques. The tasks, functions, algorithms, heuristics, and so on, can be described using data flow graphs, agents, Petri Nets, networks, and so on. The data flow graphs, agents, networks, etc. can be decomposed or partitioned into smaller operations such as kernels. The kernels can be allocated to processors such as CPUs or GPS, or to elements of the reconfigurable fabric. The allocating of elements within the reconfigurable fabric can include single processing elements, clusters of processing elements, a plurality of clusters of processing elements, co-processors, etc. The reconfigurable fabric includes elements that can be configured as processing elements, switching elements, storage elements, and so on. The configuring of the elements within the reconfigurable fabric, and the operation of the configured elements, can be controlled by rotating circular buffers. The rotating circular buffers can be coded, programmed, or "scheduled" to control the elements of the reconfigurable array. The rotating circular buffers can be statically scheduled. The schedules of the rotating circular buffers can be dynamically updated. The reconfigurable fabric supports data transfer, communications, and so on. The reconfigurable fabric further includes ports such as input ports, output ports, and input/output (bidirectional) ports, etc., which can be used to transfer data both into and out of the reconfigurable fabric.

In a reconfigurable fabric, mesh network, distributed network, or other suitable processing topology, the multiple processing elements (PEs) obtain data, process data, store data, transfer data to other processing elements, and so on. The processing that is performed can be based on kernels, agents, functions, etc., which include sets of instructions that are allocated to a single PE, a cluster of PEs, a plurality of clusters of PEs, etc. The clusters of PEs can be distributed across the reconfigurable fabric. In order for processing of the data to be performed effectively and efficiently, the data must be routed from input ports of the reconfigurable fabric, through the reconfigurable fabric, to the clusters of PEs that require the data. A matrix multiplication engine can be configured within a reconfigurable fabric. The matrix multiplication engine can be used to execute multiply-accumulate operations performed on integer matrices. The matrix multiplication engine can process various types of data, such as unstructured data, elements of a matrix or array, elements of a tensor, and so on. The operation of the matrix multiplication engine can be enhanced using pipelining.

An integer matrix multiplication engine using pipelining supports data manipulation. A first integer matrix with dimensions m×k and a second integer matrix with dimensions k×n are obtained for matrix multiplication within a processor. The processor can include clusters of elements allocated within a reconfigurable fabric. The elements of the reconfigurable fabric can include processing elements, storage elements, or switching elements. The processor can include a CPU, GPU, FPGA, ASIC, etc. The first integer matrix and the second integer matrix employ a two's complement variable radix point data representation. A variable radix point can be placed within a number of bits, where the placement of the variable radix point can be used to choose a minimum number that can be represented, a maximum number that can be represented, and an interval between each number in the range of numbers between the minimum number and the maximum number. The number of bits can include 4 bits, 8 bits, 16 bits, and so on. The first integer matrix and the second integer matrix are distilled into (j×j) submatrices. The value j can equal 4, 8, etc. A first variable radix point format for the first integer matrix and a second variable radix point format for the second integer matrix are configured dynamically. The first variable radix point format and the second variable radix point format can be substantially similar. Multiply-accumulate operations are executed in a pipelined fashion on the (j×j) submatrices of the first integer matrix and the second integer matrix, where a third variable radix point format is configured for the result. The multiply-accumulate operations can be accomplished using a multiply-accumulate (MAC) unit. The results of the matrix multiplication are output to a storage element, where the outputting takes an additional (m×k) cycles. The storage can include storage elements, DMA storage, remote DMA storage, and the like.

FIG. 1 is a flow diagram for an integer matrix multiplication engine using pipelining. A matrix multiplication engine can be used for data manipulation, where the data manipulation includes multiplication of matrices. A matrix multiplication can perform operations on a variety of types of data. The data can include unstructured data, vector data, tensor data, multi-dimensional data, and so on. An operation can be performed on a processor, where the operation can include a logical operation, an arithmetic operation, a vector operation, a tensor operation, and so on. A tensor operation can include a tensor product, a tensor contraction, raising a tensor index, lowering a tensor index, and so on. The tensor can be represented by an array, a matrix, submatrices, a data structure, etc.

The flow 100 includes obtaining 110 a first integer matrix with dimensions m×k and a second integer matrix with dimensions k×n for matrix multiplication within a processor, where the first integer matrix and the second integer matrix employ a two's complement variable radix point data representation. The matrices can represent a tensor. In embodiments, the matrices can include subsections of an o-dimensional tensor, where o is greater than 2. A processor can include a variety of types of processors such as central processing units (CPUs), graphic processing units (GPUs), arithmetic processors, multiplication processors, reconfigurable processors such as array or parallel processors, reconfigurable integrated circuits or chips such as field programmable gate arrays (FPGAs), application-specific integrated circuits (ASICs), and so on. The processor can comprise elements that can be configured. The processor can be based on elements within a reconfigurable fabric, where the elements comprise processing elements, switching elements, or storage elements. The elements within the reconfigurable fabric can be controlled by a code, a program, a schedule, and so on. In embodiments, the elements within the reconfigurable fabric are controlled by one or more circular buffers. A code, program, or schedule can be loaded into the one or more circular buffers. In embodiments, the one or more circular buffers are statically scheduled. The operation of the circular buffers can be modified. In embodiments, the one or more circular buffers can be dynamically updated. The processor can be based on a processor and memory subsystem. In embodiments, the processor and memory subsystem can be used to implement a data flow graph. The processor and memory subsystem can also be used to implement a network, a net such as a Petri Net, and so on. In embodiments, the data flow graph can implement machine learning. The machine learning can include deep learning or other learning techniques. In embodiments, the machine learning can utilize one or more convolutional neural networks. The machine learning can also utilize one or more recurrent neural networks.

In embodiments, the input elements of the first matrix are taken from a row of the first matrix. The number of rows of the first integer matrix can include m rows. In further embodiments, the input elements of the second matrix are taken from a column of the second matrix. The number of columns of the second integer matrix can include n columns. The two's complement variable radix point data presentation used for the elements of the first integer matrix and the second integer matrix can include a number of bits. In embodiments, the first variable radix point format and the second variable radix point format can include a 4-bit primitive data type. The radix point can be placed such that any or all of the four bits are to the left of the variable radix point or to the right of the variable radix point. In a usage example, a variable radix point placement such as 4.0 places all four bits to the left of the radix point, 0.4 places all four bits to the right of the radix point, and 1.3 places one bit to the left and three bits to the right of the radix point. The choice for variable radix point placement can be based on a range of numbers that can be represented and on the interval between the numbers that can be represented. In further embodiments, the first variable radix point format and the second variable radix point format can include an 8-bit primitive data type. Other primitive data type bit widths may be chosen. In embodiments, the first variable radix point format and the second variable radix point format can include a 16-bit data type. The primitive data type can further include 32-bits, 64-bits, and so on. The flow 100 further includes pipelining input elements 112 to the MAC units through two input registers. The pipelining through registers can be used to perform various manipulations of the input elements including matrix multiplication. The manipulations can further include image processing, signal processing, big data processing, and so on. Other numbers of input registers, such as four input registers, eight input registers, etc., can be used. In embodiments, a radix, or base, of two can be used.

The flow 100 includes distilling 120 the first integer matrix and the second integer matrix into (j×j) submatrices. A submatrix can be generated from a matrix by deleting rows or columns of the matrix. A matrix can be partitioned into submatrices for reasons of computational efficiency, data storage, and so on. In embodiments, j can be 4. When j=4, the resulting submatrix can include four rows and four columns. In other embodiments, j can be 8. In the latter configuration, the resulting submatrix can include eight rows and eight columns. The flow 100 includes configuring dynamically a variable radix point format for an accumulator register 130. Discussed throughout, the configuring dynamically a variable radix point format can include choosing a number of bits to the left of the radix point or the integer part of a number, and the number of bits to the right of the radix point of the fraction of the number. The selection for placement of the dynamic radix point can be based on a minimum number and a maximum number that can be represented, the size of the interval between numbers that can be represented, etc. The flow 100 further includes configuring dynamically an initial value for the accumulator register 140. The accumulator's first variable radix point and initial value enable a multiply-accumulate operation to commence. Additionally, a first variable radix point format for the first integer matrix and a second variable radix point format for the second integer matrix can be configured dynamically 145. The dynamic configuration can be based on the numerical range of the data associated with the multiply-accumulate operation to be performed.

The flow 100 includes executing multiply-accumulate operations in a pipelined fashion 150 on the (j×j) submatrices of the first integer matrix and the second integer matrix, where a third variable radix point format is configured for the result. The multiply-accumulate operations can be performed by the processor, where the processor can include a CPU, GPA, FPGA, ASIC, one or more processors within the reconfigurable fabric, and so on. The multiply-accumulate operations can be executed using one or more multiplier-accumulator (MAC) units. The one or more MAC units can be used in a pipeline fashion. In embodiments, each MAC unit used for matrix multiplication in the processor is configured to have an accumulator depth of m. Other accumulator depths can be chosen to accommodate other matrix or submatrix sizes. The flow 100 further includes outputting the results of the matrix multiplication to a storage element 160, wherein the outputting takes an additional (m×k) cycles. The storage element can include one or more storage elements within the reconfigurable fabric, DMA storage elements, remote DMA storage elements, and so on. The storage elements can be based on high bandwidth storage.

Various embodiments of the flow 100 can be included in a computer program product embodied in a non-transitory computer readable medium that includes code executable by one or more processors.

Figure 2:
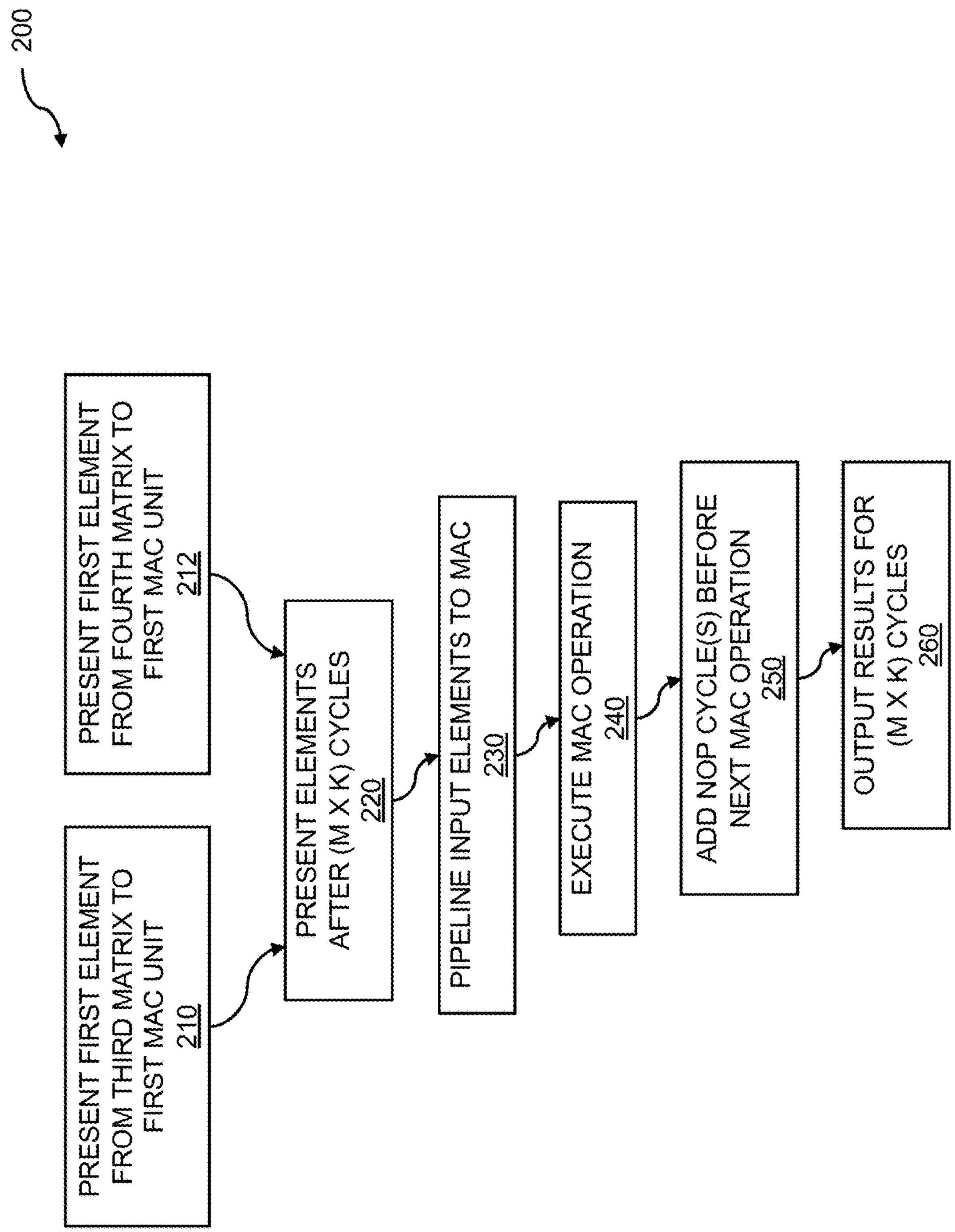
FIG. 2 is a flow diagram for cycle calculation.

FIG. 2 is a flow diagram for cycle calculation. A pipelined architecture can be based on loading data, instructions, and so on, into one or more "pipes", where the data or instructions can be operated on or executed using a series technique. Since moving data from storage to a first processor can require one or more periods of time or cycles, moving additional data to the first processor while the first processor is operating on available data saves processing time and improves computational efficiency. Further, additional operations can be performed by additional processors while the first processor is working on the additional data. Using the "assembly line" or pipelined technique enables an integer matrix multiplication engine. Once the one or more pipes have received data, then the various operations of the pipeline can be executed in parallel. To determine a period of time required for results to first emerge from a pipeline, a number of cycles can be calculated. The number of cycles can include cycles to fill the pipe, cycles to process the data within the pipe, cycles to extract results, and so on. A first integer matrix with dimensions m×k and a second integer matrix with dimensions k×n are obtained for matrix multiplication within a processor. The first integer matrix and the second integer matrix are distilled into (j×j) submatrices. A first variable radix point format for the first integer matrix and a second variable radix point format for the second integer matrix are configured dynamically. Multiply-accumulate operations are executed in a pipelined fashion on the (j×j) submatrices of the first integer matrix and the second integer matrix. A third variable radix point format is configured for the result.

The flow 200 includes presenting a first element from a third matrix to a first MAC unit 210. The first element from a third matrix can include integer data, where the integer data can employ a two's complement variable radix point data representation. The two's complement variable radix point data representation of the first element from the third matrix can be substantially similar to the two's complement variable radix point data representation of an element within the first integer matrix. The variable radix point data representations can be substantially different. The flow 200 further includes presenting a first element from a fourth matrix to a first MAC unit 212. The first elements of the third matrix and the fourth matrix can be propagated to the first MAC unit using nearest neighbor communication, a bus, etc. The elements of the third matrix and the fourth matrix can be retrieved from storage such as DMA storage or remote DMA storage. The flow 200 includes the presenting the elements which occur after (m×k) cycles 220. The (m×k) cycles can be required to complete execution of multiply-accumulate operations executed on (m×k) elements of the first integer matrix and the elements of the second integer matrix. In embodiments, a second dimension of the fourth matrix can be the same as a second dimension of the second matrix.

The flow 200 further includes pipelining input elements to the MAC 230 units through two input registers. The two input registers can include registers associated with the MAC units, and registers within a pipeline, where the pipeline can include registers in addition to the two input registers. Some embodiments include pipelining input elements to multiply-accumulate (MAC) units used for matrix multiplication in the processor through two input registers. The first elements of the third matrix and the fourth matrix can be loaded into one or more pipelines. Executing (m×k) multiply-accumulate operations can consume (m×k) elements of the first integer matrix, such as elements stored within a pipeline. The next element, within the queue, following the (m×k) elements of the first matrix, can include the first matrix of the third matrix or the first element of the fourth matrix. The pipelining input elements can include systolic data flow. Systolic data flow can include data flow between adjacent or “nearest neighbor” components such as between two or more MACs. The flow 200 includes executing multiply-accumulate operations 240 in a pipelined fashion. The multiply-accumulate operations can be performed on data extracted or consumed from registers, queues, pipelines, etc. As a result, such as a partial product, a product, a matrix multiplication product, and so on, is generated by a first MAC component, the result can be stored, passed to a second MAC to perform a next operation, and so on. While the second MAC is executing an operation, the first MAC may also be executing an operation, thus parallelizing the MAC operations. In embodiments, performing N MAC operations in parallel can reduce the amount of time needed to perform the N MAC operations from an order of magnitude of $N^3$ to an order of magnitude of $N^2$. Discussed previously, the results of the MAC operations can be stored.

The flow 200 further includes adding one or more idle or no-operation (NOP) cycles 250 after the completion of a matrix multiply operation before starting a next matrix multiply operation. No data can be processed during processing of the one or more idle or NOP cycles. The idle or NOP cycles can be based on executing NOP instructions. The idle or NOP cycles can occur as elements from one or more matrices are loaded into a queue, pipeline, storage, etc., to be operated on by one or more MAC components. The flow 200 further includes outputting the results of the matrix multiplication 260 to a storage element, wherein the outputting takes an additional (m×k) cycles. Recall that there are (m×k) elements within the first matrix. The first execution result associated with the MAC operations occurs after (m×k) MAC operations. The last result of the MAC operations is received after the additional (m×k) operations have been executed. The results of the MAC operations can be stored within storage elements located in a reconfigurable fabric, within DMA storage or remote DMA storage, within high performance memory, etc. The processing and the storage can be performed by a subsystem such as a processor and memory subsystem. The processor and memory subsystem can perform various operations based on kernels, agents, graphs, networks, and so on. In embodiments, the processor and memory subsystem is used to implement a data flow graph. The processor and memory system can be used to implement other graphs, nets such as Petri Nets, networks such as neural networks, and the like. In embodiments, the data flow graph can implement machine learning. The machine learning can include various machine learning techniques such as deep learning. The deep learning can be based on one or more neural networks. In embodiments, the machine learning utilizes one or more convolutional neural networks. The processor and memory subsystem can be based on reconfigurable hardware. In embodiments, a processor and memory subsystem can be allocated as part of one or more clusters within a reconfigurable fabric to implement MAC units. A cluster can include processing elements, storage elements, and switching elements within a reconfigurable fabric. In embodiments, each cluster of the one or more clusters within the reconfigurable fabric can be controlled by one or more circular buffers. The one or more circular buffers can be programmed, coded, scheduled, etc. In embodiments, the one or more circular buffers can be statically scheduled. The one or more circular buffers can be rescheduled or updated by reprogramming, recoding, and the like. In embodiments, the one or more circular buffers can be dynamically updated.

FIG. 3 shows dynamic radix point ranges for 4-bit numbers. A radix point is used to separate an integer portion of a number from the fractional part of the number to the right. The integer portion can be represented by a number of bits to the left of the radix point, and the fractional portion by a number of bits to the right of the radix point. The total number of bits, which equals the number of bits for the integer portion plus the number of bits for the fractional portion, equals the number of bits available to a given number representation technique. The radix point can be shifted dynamically within the number representation. Dynamic radix point ranges based on 4-bit numbers enables an integer matrix multiplication engine using pipelining. A first integer matrix and a second integer matrix that employ a two’s complement variable radix point data representation are obtained for matrix multiplication within a processor. The first and second integer matrices are distilled into submatrices. Variable radix point formats are configured dynamically for the first integer matrix and for the second integer matrix. Multiply-accumulate operations are executed in a pipelined fashion on the submatrices of the first integer matrix and the second integer matrix. A third variable radix point format is configured for the result.

An integer number representation including four bits is shown 300. The number of bits used for the number representation can be chosen based on required precision for operations such as multiplication operations, available computational resources such as an amount of available storage, performance requirements, and so on. In the example, dynamic radix point ranges for 4-bit numbers are shown 310. For 4-bit number representations, dynamic radix point representations can be defined in which zero to four bits can appear to the left of the radix point (e.g. the integer part), and four to zero bits can appear to the right of the radix point (e.g. the fractional part). Five radix point positions possible for four bits are shown 320. A zero shown in a format indicates that the radix point is positioned to the left of the four bits or to the right of the four bits. The possible combinations include Q0.4, where zero bits appear to the left of the radix point, and four bits appear to the right of the radix point; Q1.3, where one bit appears to the left and three bits to the right; and so on to Q4.0, where four bits appear to the left and zero bits appear to the right. The selection of the position of the radix point within the 4-bit number can depend on precision requirements, and can be chosen based on the range of numbers that can be represented such as minimum 322 and maximum 324 representations, the intervals 326 between the numbers, etc. For example, using the format Q0.4 with the radix point to the left of the four bits, the minimum number that can be represented is zero, the maximum number is +0.9375, and the interval is 0.0625. In contrast, placing the radix point to the right of the four bits, the minimum number is −8, the maximum number is +7, and the interval is 1. In embodiments, the number representations can be based on primitive data types comprising other numbers of bits, where the other numbers of bits can include 8 bits, 16 bits, 32 bits, and so on.

In embodiments, other dynamic radix point ranges can be included. For example, when numbers are represented by a tuple (N, P), where N=number of bits and P=position of the binary point from the right-hand side, a designation of (4, 0)=DSP Q4.0=4-bit integers; a designation of (4, 1)=DSP Q3.1=three bits to the left of the binary point and one bit to the right of the binary point (mixed number); and (4, 4)=DSP Q0.4=zero bits to the left of the binary point and four bits to the right of the binary point (fractional number). In other embodiments, a designation of (4, 5)=a binary representation of sxxxx, where s=sign and xxxx=4-bits of an original number; a designation of (4, −1)=a binary representation of xxxx0.0, where xxxx=4-bits of an original number. In such representations, the value N from (N, P) may be limited to 4-, 8-, 16-, or 32-bits, based on a $2^n$ binary implementation, but the value of P from (N, P) can be any value.

FIG. 4 illustrates dynamic radix point ranges for 8-bit numbers 400. Discussed throughout, variable radix point formats can be used to represent values such as values found within an integer matrix. The number of bits used for representing the values such as integer values can be chosen to increase precision (more bits), decrease computation time (fewer bits), and so on. Further placement of a dynamic radix point within the bits can be used to change the range of numbers the bits can represent, and the size of the interval between the represented numbers. Dynamic radix point ranges based on 8-bit numbers support an integer matrix multiplication engine using pipelining. A first integer matrix and a second integer matrix that employ a two's complement variable radix point data representation are obtained for matrix multiplication within a processor. The first integer matrix and the second integer matrix are distilled into submatrices. A first variable radix point format is configured dynamically for the first integer matrix and a second variable radix point format is configured dynamically for the second integer matrix. Multiply-accumulate operations are executed in a pipelined fashion on the submatrices of the first integer matrix and the second integer matrix, where a third variable radix point format is configured for the result.

Dynamic radix point ranges for 8-bit numbers are shown 410. For 8-bit numbers, radix point representations can be defined in which zero to eight bits can appear to the left of the radix point, and eight to zero bits can appear to the right of the radix point. The nine combinations possible for eight bits are shown 420. The combinations include Q0.8, where zero bits appear to the left of the radix point, and eight bits appear to the right of the radix point; Q1.7, where one bit appears to the left and seven bits to the right; and so on to Q8.0, where eight bits appear to the left and zero bits to the right. The selection of the position of the radix point within the 8-bit number can be chosen based on the range of numbers that can be represented such as minimum 422 and maximum 424 representations, the intervals 426 between the numbers, etc. For example, using the format Q0.8 with the radix point to the left of the eight bits, the minimum number that can be represented is zero, the maximum number is +0.99609375, and the interval is 0.00390625. In contrast, placing the radix point to the right of the bits, the minimum number is −128, the maximum number is +127, and the interval is 1.

FIG. 5 shows matrix multiplication 500. Matrices can be multiplied together to accomplish a variety of data manipulation computations. The data manipulation computations can be executed for applications such as image processing and analysis, audio processing, and so on. The values within the matrices can be represented using a variety of numbering representations such as integer, real, or floating-point representations. Matrix multiplication for data manipulation enables an integer matrix multiplication engine using pipelining. A first integer matrix with dimensions m×k and a second integer matrix with dimensions k×n are obtained for matrix multiplication within a processor, where the first integer matrix and the second integer matrix employ a two's complement variable radix point data representation. The first integer matrix and the second integer matrix are distilled into (j×j) submatrices. A first variable radix point format is configured dynamically for the first integer matrix and a second variable radix point format is configured dynamically for the second integer matrix. Multiply-accumulate operations are executed in a pipelined fashion on the (j×j) submatrices of the first integer matrix and the second integer matrix, where a third variable radix point format is configured for the result.

A matrix multiplication example is shown in which a first matrix is multiplied by a second matrix to computer a product matrix. The first integer matrix A 510 is of size m×k, where m=4 and k=3. The second integer matrix B 520 is of size k×n, where k=3 and n=3. A product matrix C 530 results from multiplying the first and second matrices together. The product matrix is of size m×n, where m=4 and n=3. Each matrix comprises elements, where the elements employ a two's complement variable radix point data representation. The elements of the first or A matrix are labeled across rows, such as [a, b, c]; [d, e, f]; . . . [j, k, l]. The elements of the second or B matrix are labeled across rows, such as [m, n, o], . . . [s, t, u]. Each element of the product matrix C is generated by computing a sum of products from elements of a row of the first matrix by the elements of a column of the second matrix. To compute the first element of the first row of the production matrix C, element C (1, 1), a sum of products is computed from the elements of the first row of matrix A and the first column of matrix B. Element C (1, 1)=(am+bp+cs). Similarly, the second element of the first row of the product matrix C, element C (1, 2), is computed by a sum of products from the elements of the first row of matrix A and the second column of matrix B. Element C (1, 2)=(an+bq+ct). The sums of products can be computed for the remaining elements of the product matrix C using a similar technique.

Figure 6:
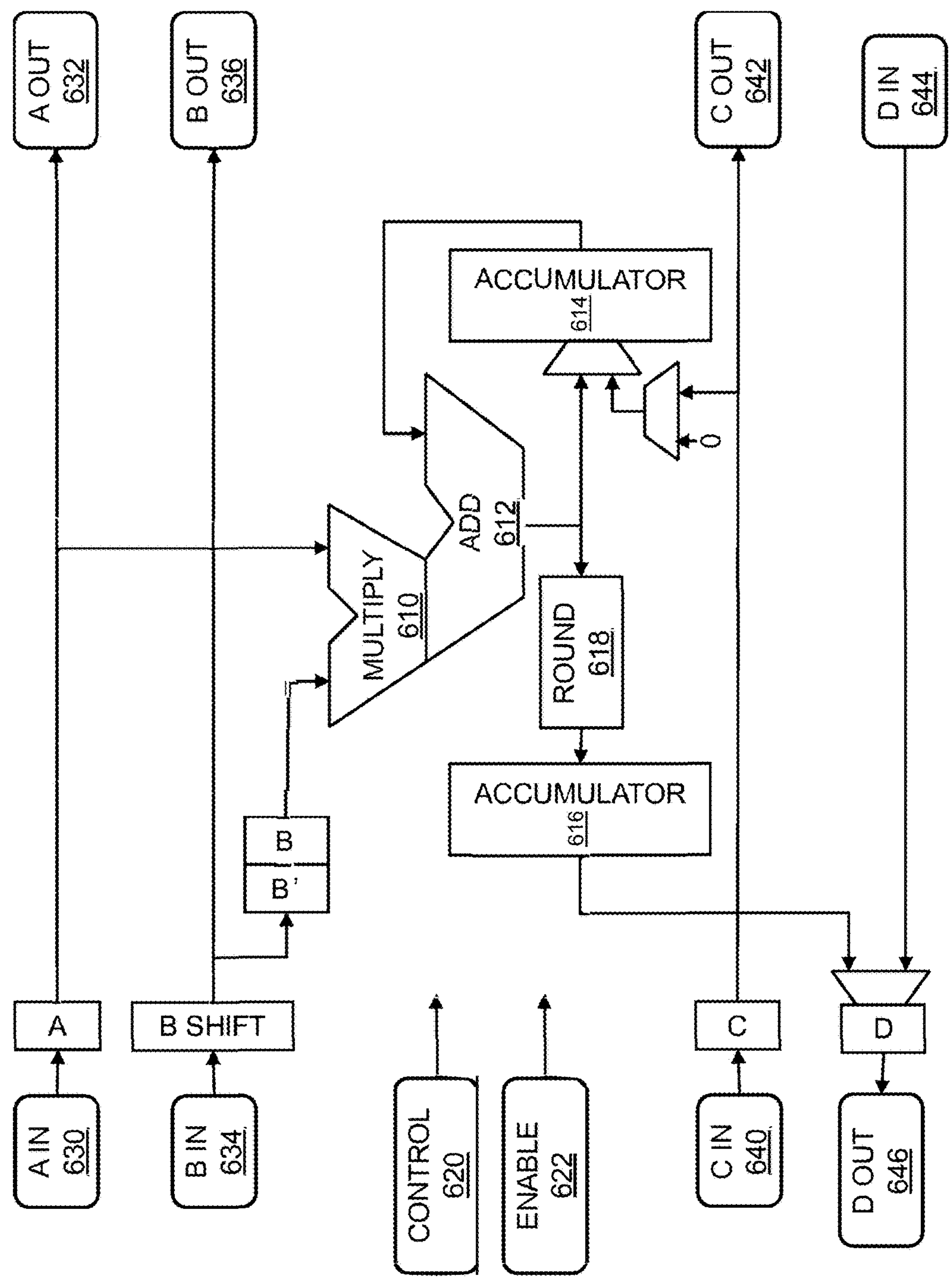
FIG. 6 illustrates a multiply-accumulate (MAC) block diagram.

FIG. 6 illustrates a multiply-accumulate (MAC) block diagram. A multiply-add block can be augmented with one or more accumulators to form a multiply-accumulate (MAC) block 600. The MAC block can be further augmented with one or more pipeline stages to enable pipelining of the MAC block. A pipelined MAC block enables an integer matrix multiplication engine using pipelining. A first integer matrix with dimensions m×k and a second integer matrix with dimensions k×n are obtained for matrix multiplication within a processor. The first integer matrix and the second integer matrix are distilled into (j×j) submatrices. A first variable radix point format is configured dynamically for the first integer matrix and a second variable radix point format is configured dynamically for the second integer matrix. Multiply-accumulate operations are executed in a pipelined fashion on the (j×j) submatrices of the first integer matrix and the second integer matrix, where a third variable radix point format is configured for the result.

A multiply-add block can be augmented with further components to enable the multiply-add block to perform multiply-accumulate operations in a pipelined fashion. A multiplier 610 and an adder 612 can comprise a basic multiply-add block. A variety of techniques can be used for the multiplier such as repeated addition, Booth Encoding, etc. Techniques that can be used for the adder include ripple carry, carry lookahead, carry select, and the like. An accumulator keeps a "running total" by adding a value to a previous value. One or more accumulators can be added to the basic multiply-add block. In embodiments, an accumulator 614 can be selectively set to zero or to a value. Other accumulators may be added to the multiply-add block. In embodiments, an accumulator 616 can be used to keep a running total of partial products resulting from multiplication. Since multiplication results in a number with a bit-width larger than the bit-widths of the numbers being multiplied together, a rounding block 618 or a truncation block (not shown) may be included to adjust the number of bits to be held in accumulator 616.

The multiply-accumulate block can include one or more control signals 620. The control signals can include one or more load signals for loading one or more registers with input data, loading one or more registers with output data, and the like. The control signals can include shift signals, select signals, clear signals, write or read signals, mode signals, fill signals, etc. The MAC block can include one or more enable signals 622. The one or more enable signals can be used to enable or disable the MAC block, to enable or disable portions of the MAC block, and the like. The MAC block can include data inputs such as data inputs A in 630, B in 634, and C in 640. The inputs can be coupled to a register, such as registers A and C, a shift register such as B shift, a pipeline, etc. The input signals can be coupled to outputs such as A out 632, B out 636, and C out 642. The output can be used to propagate signals such as A, B, and C to further MAC blocks or other blocks. The MAC block can include one or more outputs such as D out 646. The D output can be fed from a register such as the D register. The contents of the D register can be selected from an output of an accumulator such as accumulator 616, an input such as D in 644, and the like. The D input can be used to propagate a signal to further MAC blocks. The MAC block can execute multiply-accumulate operations in a pipelined fashion. In embodiments, executing multiply-accumulate operations in a pipelined fashion can be accomplished using systolic data flow. The systolic data flow can include data flow between nearest neighbor MAC blocks.

FIG. 7 shows pipelined matrix multiply results. Multiplication and other operations such as logical operations can be accelerated by using a pipelining technique. The multiplication, which can include matrix multiplication, can enable data manipulation. Matrix multiplication can be performed based on an integer matrix multiplication engine using pipelining. A first integer matrix with dimensions m×k and a second integer matrix with dimensions k×n can be obtained for matrix multiplication within a processor. The first integer matrix and the second integer matrix can employ a two's complement variable radix point data representation. The first integer matrix and the second integer matrix can be distilled into (j×j) submatrices. A first variable radix point format can be configured dynamically for the first integer matrix and a second variable radix point format can be configured dynamically for the second integer matrix. Multiply-accumulate operations can be executed in a pipelined fashion on the (j×j) submatrices of the first integer matrix and the second integer matrix. A third variable radix point format is configured for the result.

The FIG. 700 shows results from pipelined matrix multiplication operations. In the example, the first integer matrix is of size m×k, where m=4 and k=3. The second integer matrix is of size k×n, where k=3 and n=3. The elements of the first or A matrix are labeled across rows, such as [a, b, c]; [d, e, f]; . . . [j, k, l]. The elements of the second or B matrix are labeled across rows, such as [m, n, o]; . . . [s, t, u]. As discussed throughout, the first row of elements of the product matrix is computed to equal (am+bp+cs); (an+bq+ct); and (ao+br+cu). Since the value a from the A matrix is multiplied by each element of the first column of the B matrix, the value a and the values m, p, and s can be fed into an A input pipeline 710 and into a B input pipeline 712, respectively. The pipelines provide data to three MAC units, MAC0 720, MAC1 722, and MAC2 724. This technique enables the three multiplications to be performed in parallel by the three MAC units. Further elements of the A matrix and further elements of the B matrix are added to the A input pipeline and the B input pipeline, respectively. The sum of products is computed for the first element of the product matrix using an accumulator. Similar operations are executed for each row of matrix A and each column of matrix B. For the example given, at the fourteenth pipeline step 730, the first element of the product matrix 740 can be placed in an output product pipeline. Values for elements of the product matrix can be computed for each subsequent pipeline step until the sum of products is calculated for the last element of the output product matrix at pipeline step twenty-eight.

Figure 8:
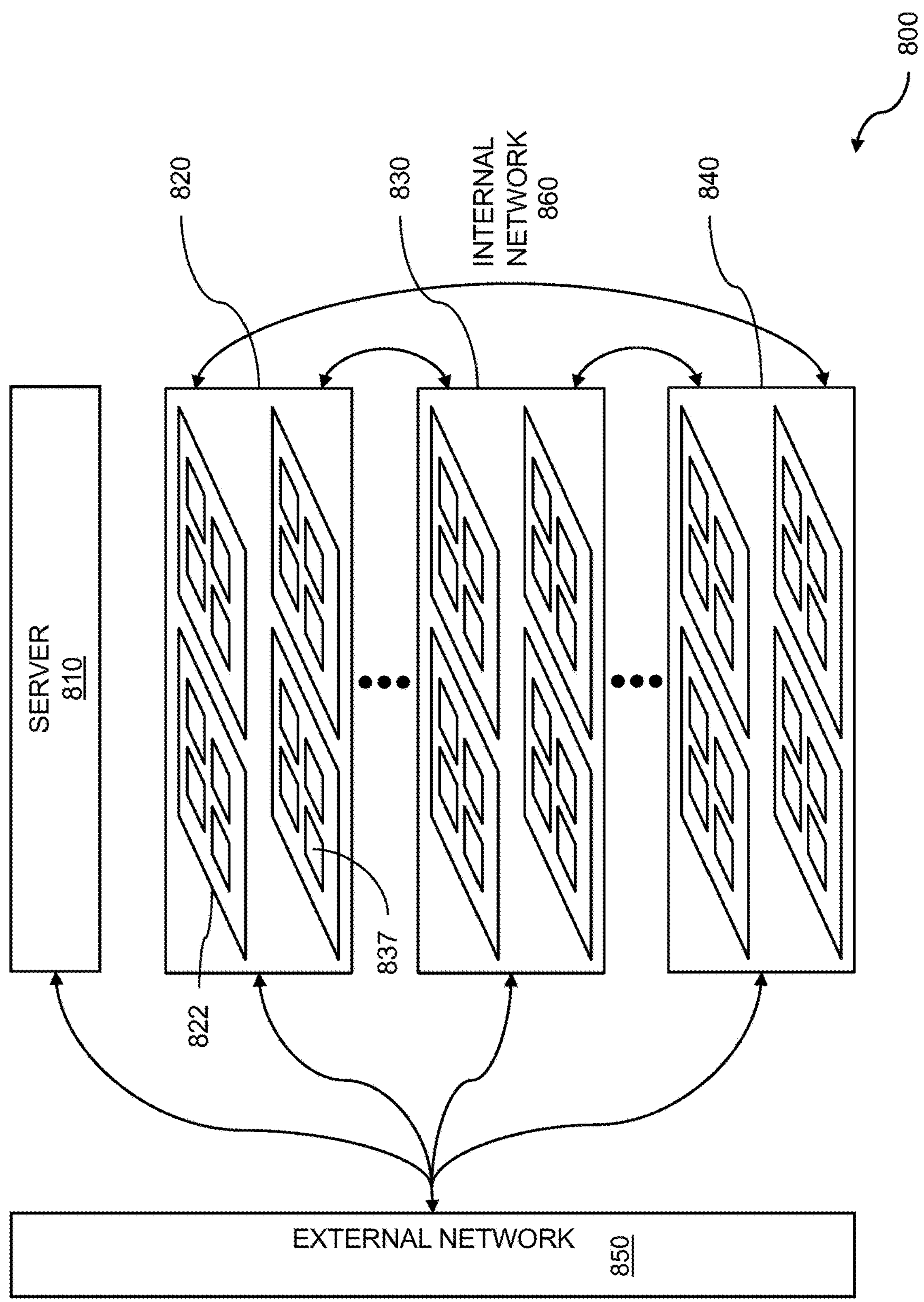
FIG. 8 illustrates a server allocating FIFOs and processing elements.

FIG. 8 illustrates a server allocating FIFOs and processing elements. A data flow graph, directed flow graph, Petri Net, network, and so on, can be allocated to first in first out registers (FIFO) and to elements. The elements can include processing elements, storage elements, switching elements, and so on. First in first out (FIFO) techniques can be used to support an integer matrix multiplication engine using pipelining. The FIFOs and the processing elements can include elements within a reconfigurable fabric. The processing elements can be grouped into clusters, where the clusters can be configured to execute one or more functions. The functions can include data manipulation functions. The processing elements can be configured to implement kernels, agents, a data flow graph, a network, and so on, by programming, coding, or "scheduling" one or more rotating circular buffers. The one or more circular buffers can be statically scheduled. The one or more circular buffers can be dynamically updated. A processor and a memory subsystem can be allocated as part of one or more clusters within a reconfigurable fabric for data manipulation. A first and a second integer matrix are obtained for matrix multiplication within a processor, and the matrices are distilled into submatrices. Variable radix point formats are configured dynamically for the matrices, and multiply-accumulate operations are executed in a pipelined fashion. A third variable radix point format is configured for the result.

The system 800 can allocate one or more first in first outs (FIFOs) and processing elements (PEs) for reconfigurable fabric data routing. The system can include a server 810 allocating FIFOs and processing elements. In embodiments, system 800 includes one or more boxes, indicated by callouts 820, 830, and 840. Each box may have one or more boards, indicated generally as 822. Each board comprises one or more chips, indicated generally as 837. Each chip may include one or more processing elements, where at least some of the processing elements may execute a process agent, a kernel, or the like. An internal network 860 allows for communication between and among the boxes such that processing elements on one box can provide and/or receive results from processing elements on another box. The server 810 may be a computer executing programs on one or more processors based on instructions contained in a non-transitory computer readable medium. The server 810 may perform reconfiguring of a mesh networked computer system comprising a plurality of processing elements with a FIFO between one or more pairs of processing elements. In some embodiments, each pair of processing elements has a dedicated FIFO configured to pass data between the processing elements of the pair. The server 810 may receive instructions and/or input data from external network 850. The external network may provide information that includes, but is not limited to, hardware description language instructions (e.g. Verilog, VHDL, or the like), flow graphs, source code, or information in another suitable format.

The server 810 may collect performance statistics on the operation of the collection of processing elements. The performance statistics can include the number of fork or join operations, average sleep time of a processing element, and/or a histogram of the sleep time of each processing element. Any outlier processing elements that sleep for a time period longer than a predetermined threshold can be identified. In embodiments, the server can resize FIFOs or create new FIFOs to reduce the sleep time of a processing element that exceeds the predetermined threshold. Sleep time is essentially time when a processing element is not producing meaningful results, so it is generally desirable to minimize the amount of time a processing element spends in a sleep mode. In some embodiments, the server 810 may serve as an allocation manager to process requests for adding or freeing FIFOs, and/or changing the size of existing FIFOs in order to optimize operation of the processing elements.

In some embodiments, the server may receive optimization settings from the external network 850. The optimization settings may include a setting to optimize for speed, optimize for memory usage, or balance between speed and memory usage. Additionally, optimization settings may include constraints on the topology, such as a maximum number of paths that may enter or exit a processing element, maximum data block size, and other settings. Thus, the server 810 can perform a reconfiguration based on user-specified parameters via the external network 850.

Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include calculation input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs positioned in arrangements such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be a portion of a data flow graph. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. A configuration mode can be entered. Various techniques, including direct memory access (DMA) can be used to load instructions from the kernel into instruction memories of the PEs. The clusters that were preprogrammed to enter configuration mode can be preprogrammed to exit configuration mode. When configuration mode has been exited, execution of the one or more kernels loaded onto the clusters can commence. In embodiments, clusters can be reprogrammed and during the reprogramming, switch instructions used for routing are not disrupted so that routing continues through a cluster.

Data flow processes that can be executed by data flow processor can be managed by a software stack. A software stack can include a set of subsystems, including software subsystems, which may be needed to create a software platform. A complete software platform can include a set of software subsystems required to support one or more applications. A software stack can include both offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so one. The agent source code that can be operated on by the software development kit can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit can include a variety of tools which can be used to support a deep learning technique or other technique which requires processing of large amounts of data such as unstructured data. The SDK can support multiple machine learning techniques such as machine learning techniques based on GEMM™, sigmoid, and so on. The SDK can include a low-level virtual machine (LLVM) which can serve as a front end to the SDK. The SDK can include a simulator. The SDK can include a Boolean satisfiability solver (SAT solver). The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a flow graph.

Figure 9:
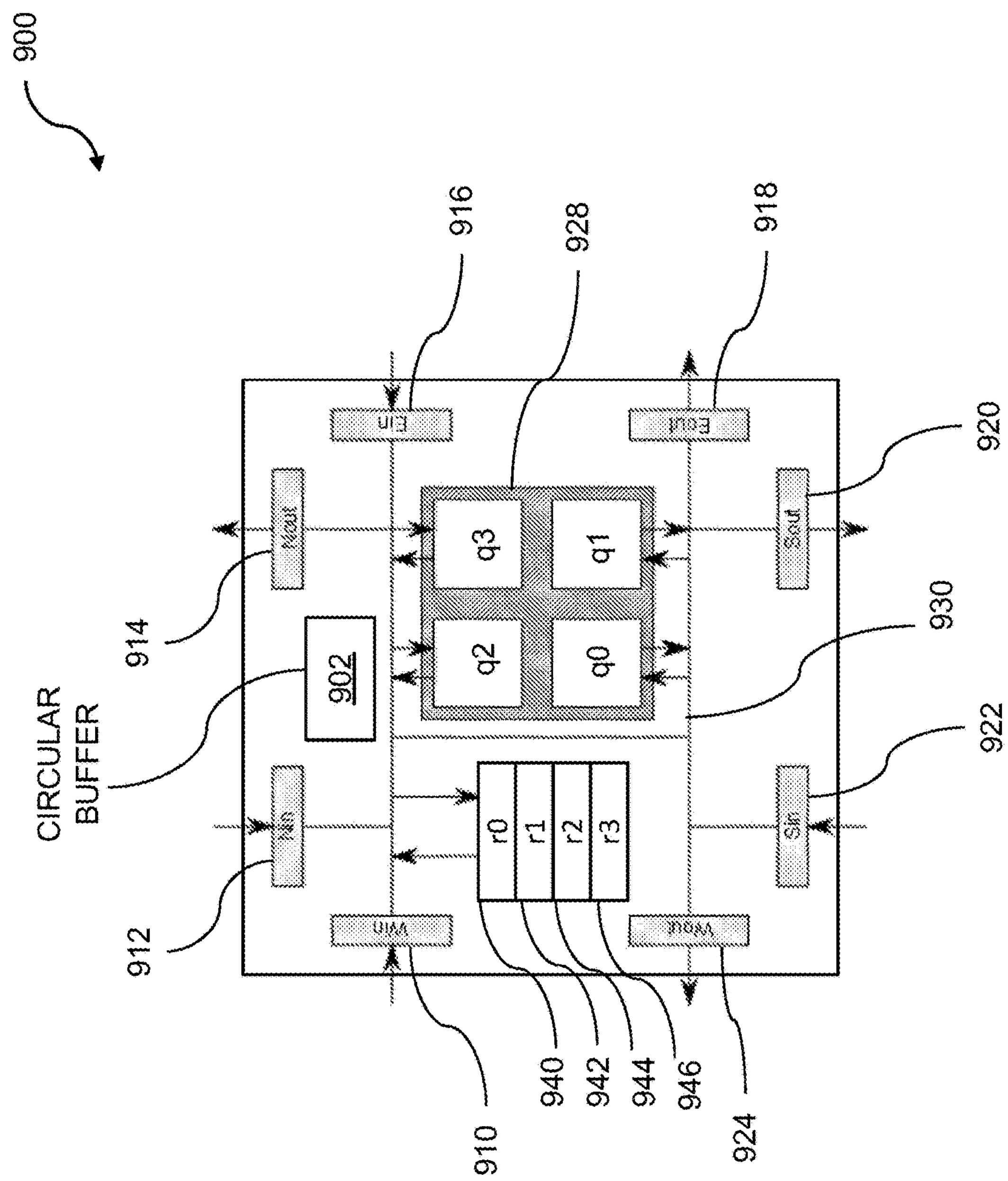
FIG. 9 shows a cluster for coarse-grained reconfigurable processing.

FIG. 9 shows a cluster for coarse-grained reconfigurable processing. The cluster 900 for coarse-grained reconfigurable processing can enable an integer matrix multiplication engine using pipelining. The integer matrix multiplication engine can be implemented within reconfigurable hardware such as a reconfigurable fabric. The configuration of the reconfigurable fabric includes allocating a plurality of clusters within a reconfigurable fabric, where the plurality of clusters is configured to execute one or more functions. The functions can be associated with data manipulation. The functions can include tensor calculations, arithmetic operations, logical functions, matrix multiplications, tasks, agents, and so on. The clusters can include processing elements, switching elements, storage elements, and so on. A first integer matrix with dimensions m×k and a second integer matrix with dimensions k×n are obtained for matrix multiplication within a processor, where the first integer matrix and the second integer matrix employ a two's complement variable radix point data representation. The first integer matrix and the second integer matrix are distilled into (j×j) submatrices. A first variable radix point format is configured dynamically for the first integer matrix and a second variable radix point format is configured dynamically for the second integer matrix. Multiply-accumulate operations are executed in a pipelined fashion on the (j×j) submatrices of the first integer matrix and the second integer matrix, where a third variable radix point format is configured for the result.

The cluster 900 comprises a circular buffer 902. The circular buffer 902 can be referred to as a main circular buffer or a switch-instruction circular buffer. In some embodiments, the cluster 900 comprises additional circular buffers corresponding to processing elements within the cluster. The additional circular buffers can be referred to as processor instruction circular buffers. The example cluster 900 comprises a plurality of logical elements, configurable connections between the logical elements, and a circular buffer 902 controlling the configurable connections. The logical elements can further comprise one or more of switching elements, processing elements, or storage elements. The example cluster 900 also comprises four processing elements—q0, q1, q2, and q3. The four processing elements can collectively be referred to as a "quad," and can be jointly indicated by a grey reference box 928. In embodiments, there is intercommunication among and between each of the four processing elements. In embodiments, the circular buffer 902 controls the passing of data to the quad of processing elements 928 through switching elements. In embodiments, the four processing elements 928 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message transfer via a bus or shared memory interface. Power gating can be applied to one or more processors (e.g. q1) in order to reduce power.

The cluster 900 can further comprise storage elements coupled to the configurable connections. As shown, the cluster 900 comprises four storage elements—r0 940, r1 942, r2 944, and r3 946. The cluster 900 further comprises a north input (Nin) 912, a north output (Nout) 914, an east input (Ein) 916, an east output (Eout) 918, a south input (Sin) 922, a south output (Sout) 920, a west input (Win) 910, and a west output (Wout) 924. The circular buffer 902 can contain switch instructions that implement configurable connections. For example, an instruction effectively connects the west input 910 with the north output 914 and the east output 918 and this routing is accomplished via bus 930. The cluster 900 can further comprise a plurality of circular buffers residing on a semiconductor chip where the plurality of circular buffers controls unique, configurable connections between and among the logical elements. The storage elements can include instruction random access memory (I-RAM) and data random access memory (D-RAM). The I-RAM and the D-RAM can be quad I-RAM and quad D-RAM, respectively, where the I-RAM and/or the D-RAM supply instructions and/or data, respectively, to the processing quad of a switching element.

A preprocessor or compiler can be configured to prevent data collisions within the circular buffer 902. The prevention of collisions can be accomplished by inserting no-op or sleep instructions into the circular buffer (pipeline). Alternatively, in order to prevent a collision on an output port, intermediate data can be stored in registers for one or more pipeline cycles before being sent out on the output port. In other situations, the preprocessor can change one switching instruction to another switching instruction to avoid a conflict. For example, in some instances the preprocessor can change an instruction placing data on the west output 924 to an instruction placing data on the south output 920, such that the data can be output on both output ports within the same pipeline cycle. In a case where data needs to travel to a cluster that is both south and west of the cluster 900, it can be more efficient to send the data directly to the south output port rather than to store the data in a register first, and then to send the data to the west output on a subsequent pipeline cycle.

An L2 switch interacts with the instruction set. A switch instruction typically has both a source and a destination. Data is accepted from the source and sent to the destination. There are several sources (e.g. any of the quads within a cluster, any of the L2 directions—North, East, South, West, a switch register, or one of the quad RAMs—data RAM, IRAM, PE/Co Processor Register). As an example, to accept data from any L2 direction, a "valid" bit is used to inform the switch that the data flowing through the fabric is indeed valid. The switch will select the valid data from the set of specified inputs. For this to function properly, only one input can have valid data, and the other inputs must all be marked as invalid. It should be noted that this fan-in operation at the switch inputs operates independently for control and data. There is no requirement for a fan-in mux to select data and control bits from the same input source. Data valid bits are used to select valid data, and control valid bits are used to select the valid control input. There are many sources and destinations for the switching element, which can result in excessive instruction combinations, so the L2 switch has a fan-in function enabling input data to arrive from one and only one input source. The valid input sources are specified by the instruction. Switch instructions are therefore formed by combining a number of fan-in operations and sending the result to a number of specified switch outputs.

In the event of a software error, multiple valid bits may arrive at an input. In this case, the hardware implementation can perform any safe function of the two inputs. For example, the fan-in could implement a logical OR of the input data. Any output data is acceptable because the input condition is an error, so long as no damage is done to the silicon. In the event that a bit is set to '1' for both inputs, an output bit should also be set to '1'. A switch instruction can accept data from any quad or from any neighboring L2 switch. A switch instruction can also accept data from a register or a microDMA controller. If the input is from a register, the register number is specified. Fan-in may not be supported for many registers as only one register can be read in a given cycle. If the input is from a microDMA controller, a DMA protocol is used for addressing the resource.

For many applications, the reconfigurable fabric can be a DMA slave, which enables a host processor to gain direct access to the instruction and data RAMs (and registers) that are located within the quads in the cluster. DMA transfers are initiated by the host processor on a system bus. Several DMA paths can propagate through the fabric in parallel. The DMA paths generally start or finish at a streaming interface to the processor system bus. DMA paths may be horizontal, vertical, or a combination (as determined by a router). To facilitate high bandwidth DMA transfers, several DMA paths can enter the fabric at different times, providing both spatial and temporal multiplexing of DMA channels. Some DMA transfers can be initiated within the fabric, enabling DMA transfers between the block RAMs without external supervision. It is possible for a cluster "A", to initiate a transfer of data between cluster "B" and cluster "C" without any involvement of the processing elements in clusters "B" and "C". Furthermore, cluster "A" can initiate a fan-out transfer of data from cluster "B" to clusters "C", "D", and so on, where each destination cluster writes a copy of the DMA data to different locations within their Quad RAMs. A DMA mechanism may also be used for programming instructions into the instruction RAMs.

Accesses to RAMs in different clusters can travel through the same DMA path, but the transactions must be separately defined. A maximum block size for a single DMA transfer can be 8 KB. Accesses to data RAMs can be performed either when the processors are running or while the processors are in a low power "sleep" state. Accesses to the instruction RAMs and the PE and Co-Processor Registers may be performed during configuration mode. The quad RAMs may have a single read/write port with a single address decoder, thus allowing shared access by the quads and the switches. The static scheduler (i.e. the router) determines when a switch is granted access to the RAMs in the cluster. The paths for DMA transfers are formed by the router by placing special DMA instructions into the switches and determining when the switches can access the data RAMs. A microDMA controller within each L2 switch is used to complete data transfers. DMA controller parameters can be programmed using a simple protocol that forms the "header" of each access.

In embodiments, the computations that can be performed on a cluster for coarse-grained reconfigurable processing can be represented by a data flow graph. Data flow processors, data flow processor elements, and the like, are particularly well suited to processing the various nodes of data flow graphs. The data flow graphs can represent communications between and among agents, matrix computations, tensor manipulations, Boolean functions, and so on. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of high quality data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs arranged in configurations such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value of minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the clusters enter the configuration mode, various techniques, including direct memory access (DMA) can be used to load instructions from the kernel into instruction memories of the PEs. The clusters that were preprogrammed in configuration mode can also be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as those based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

A reconfigurable fabric can include quads of elements. The elements of the reconfigurable fabric can include processing elements, switching elements, storage elements, and so on. An element such as a storage element can be controlled by a rotating circular buffer. In embodiments, the rotating circular buffer can be statically scheduled. The data operated on by the agents that are resident within the reconfigurable buffer can include tensors. Tensors can include one or more blocks. The reconfigurable fabric can be configured to process tensors, tensor blocks, tensors and blocks, etc. One technique for processing tensors includes deploying agents in a pipeline. That is, the output of one agent can be directed to the input of another agent. Agents can be assigned to clusters of quads, where the clusters can include one or more quads. Multiple agents can be pipelined when there are sufficient clusters of quads to which the agents can be assigned. Multiple pipelines can be deployed. Pipelining of the multiple agents can reduce the sizes of input buffers, output buffers, intermediate buffers, and other storage elements. Pipelining can further reduce memory bandwidth needs of the reconfigurable fabric.

Agents can be used to support dynamic reconfiguration of the reconfigurable fabric. The agents that support dynamic reconfiguration of the reconfigurable fabric can include interface signals in a control unit. The interface signals can include suspend, agent inputs empty, agent outputs empty, and so on. The suspend signal can be implemented using a variety of techniques such as a semaphore, a streaming input control signal, and the like. When a semaphore is used, the agent that is controlled by the semaphore can monitor the semaphore. In embodiments, a direct memory access (DMA) controller can wake the agent when the setting of the semaphore has been completed. The streaming control signal, if used, can wake a control unit if the control unit is sleeping. A response received from the agent can be configured to interrupt the host software.

The suspend semaphore can be asserted by runtime software in advance of commencing dynamic reconfiguration of the reconfigurable fabric. Upon detection of the semaphore, the agent can begin preparing for entry into a partially resident state. A partially resident state for the agent can include having the agent control unit resident after the agent kernel is removed. The agent can complete processing of any currently active tensor being operated on by the agent. In embodiments, a done signal and a fire signal may be sent to upstream or downstream agents, respectively. A done signal can be sent to the upstream agent to indicate that all data has been removed from its output buffer. A fire signal can be sent to a downstream agent to indicate that data in the output buffer is ready for processing by the downstream agent. The agent can continue to process incoming done signals and fire signals, but will not commence processing of any new tensor data after completion of the current tensor processing by the agent. The semaphore can be reset by the agent to indicate to a host that the agent is ready to be placed into partial residency. In embodiments, having the agent control unit resident after the agent kernel is removed comprises having the agent partially resident. A control unit may not assert one or more signals, nor expect one or more responses from a kernel in the agent, when a semaphore has been reset.

Other signals from an agent can be received by a host. The signals can include an agent inputs empty signal, an agent outputs empty signal, and so on. The agent inputs empty signal can be sent from the agent to the host and can indicate that the input buffers are empty. The agent inputs empty signal can only be sent from the agent when the agent is partially resident. The agent outputs empty signal can be sent from the agent to the host and can indicate that the output buffers are empty. The agent outputs empty can only be sent from the agent to the host when the agent is partially resident. When the runtime (host) software receives both signals, agent inputs empty and agent outputs empty, from the partially resident agent, the agent can be swapped out of the reconfigurable fabric and can become fully vacant.

Recall that an agent can be one of a plurality of agents that form a data flow graph. The data flow graph can be based on a plurality of subgraphs. The data flow graph can be based on agents which can support three states of residency: fully resident, partially resident, and fully vacant. A complete subsection (or subgraph) based on the agents that support the three states of residency can be swapped out of the reconfigurable fabric. The swapping out of the subsection can be based on asserting a suspend signal input to an upstream agent. The asserting of the suspend signal can be determined by the runtime software. When a suspend signal is asserted, the agent can stop consuming input data such as an input sensor. The tensor can queue within the input buffers of the agent. The agent kernel can be swapped out of the reconfigurable fabric, leaving the agent partially resident while the agent waits for the downstream agents to drain the output buffers for the agent. When an upstream agent is fully resident, the agent may not be able to be fully vacant because a fire signal might be sent to the agent by the upstream agent. When the upstream agent is partially resident or is fully vacant, then the agent can be fully vacated from the reconfigurable fabric. The agent can be fully vacated if it asserts both the input buffers empty and output buffers empty signals.

Figure 10:
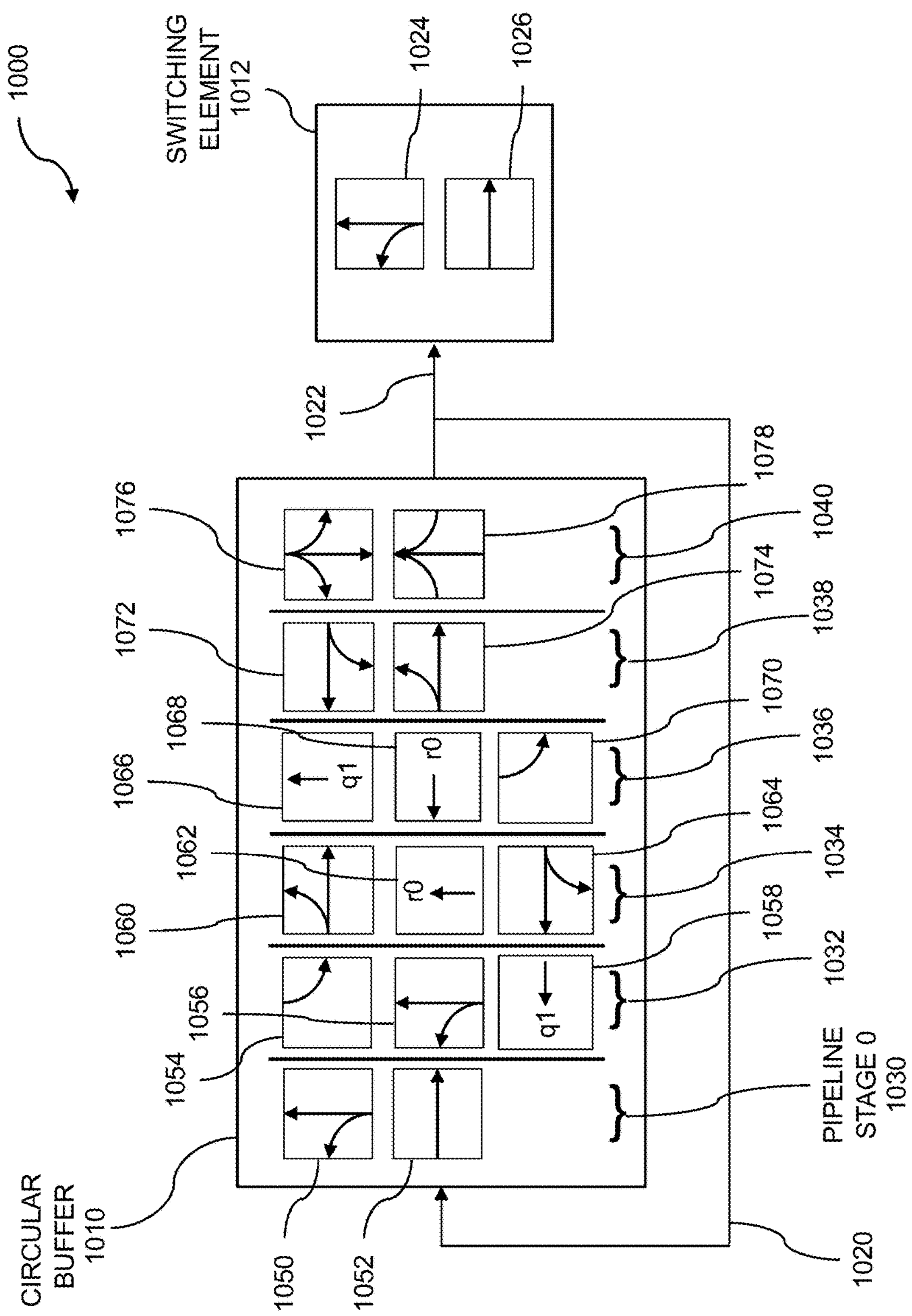
FIG. 10 illustrates a block diagram of a circular buffer.

FIG. 10 illustrates a block diagram 1000 of a circular buffer. The circular buffer can include a switching element 1012 corresponding to the circular buffer. The circular buffer and the corresponding switching element can be used in part for an integer matrix multiplication engine using pipelining. Using the circular buffer 1010 and the corresponding switching element 1012, data can be obtained from a first switching unit, where the first switching unit can be controlled by a first circular buffer. Data can be sent to a second switching element, where the second switching element can be controlled by a second circular buffer. The obtaining data from the first switching element and the sending data to the second switching element can include a direct memory access (DMA), remote DMA (RDMA), distributed DMA, etc. The block diagram 1000 describes a processor-implemented method for data manipulation. The circular buffer 1010 contains a plurality of pipeline stages. Each pipeline stage contains one or more instructions, up to a maximum instruction depth. In the embodiment shown in FIG. 10, the circular buffer 1010 is a 6×3 circular buffer, meaning that it implements a six-stage pipeline with an instruction depth of up to three instructions per stage (column). Hence, the circular buffer 1010 can include one, two, or three switch instruction entries per column. In some embodiments, the plurality of switch instructions per cycle can comprise two or three switch instructions per cycle. However, in certain embodiments, the circular buffer 1010 supports only a single switch instruction in a given cycle. In the example 1000 shown, Pipeline Stage 0 1030 has an instruction depth of two instructions 1050 and 1052. Though the remaining pipeline stages 1-5 are not textually labeled in the FIG. 1000, the stages are indicated by callouts 1032, 1034, 1036, 1038, and 1040. Pipeline stage 1 1032 has an instruction depth of three instructions 1054, 1056, and 1058. Pipeline stage 2 1034 has an instruction depth of three instructions 1060, 1062, and 1064. Pipeline stage 3 1036 also has an instruction depth of three instructions 1066, 1068, and 1070. Pipeline stage 4 1038 has an instruction depth of two instructions 1072 and 1074. Pipeline stage 5 1040 has an instruction depth of two instructions 1076 and 1078. In embodiments, the circular buffer 1010 includes 64 columns. During operation, the circular buffer 1010 rotates through configuration instructions. The circular buffer 1010 can dynamically change operation of the logical elements based on the rotation of the circular buffer. The circular buffer 1010 can comprise a plurality of switch instructions per cycle for the configurable connections.

The instruction 1052 is an example of a switch instruction. In embodiments, each cluster has four inputs and four outputs, each designated within the cluster's nomenclature as "north," "east," "south," and "west" respectively. For example, the instruction 1052 in the diagram 1000 is a west-to-east transfer instruction. The instruction 1052 directs the cluster to take data on its west input and send out the data on its east output. In another example of data routing, the instruction 1050 is a fan-out instruction. The instruction 1050 instructs the cluster to take data from its south input and send out on the data through both its north output and its west output. The arrows within each instruction box indicate the source and destination of the data. The instruction 1078 is an example of a fan-in instruction. The instruction 1078 takes data from the west, south, and east inputs and sends out the data on the north output. Therefore, the configurable connections can be considered to be time multiplexed.

In embodiments, the clusters implement multiple storage elements in the form of registers. In the example 1000 shown, the instruction 1062 is a local storage instruction. The instruction 1062 takes data from the instruction's south input and stores it in a register (r0). Another instruction (not shown) is a retrieval instruction. The retrieval instruction takes data from a register (e.g. r0) and outputs it from the instruction's output (north, south, east, west). Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

The obtaining data from a first switching element and the sending the data to a second switching element can include a direct memory access (DMA). A DMA transfer can continue while valid data is available for the transfer. A DMA transfer can terminate when it has completed without error, or when an error occurs during operation. Typically, a cluster that initiates a DMA transfer will request to be brought out of sleep state when the transfer is complete. This waking is achieved by setting control signals that can control the one or more switching elements. Once the DMA transfer is initiated with a start instruction, a processing element or switching element in the cluster can execute a sleep instruction to place itself to sleep. When the DMA transfer terminates, the processing elements and/or switching elements in the cluster can be brought out of sleep after the final instruction is executed. Note that if a control bit can be set in the register of the cluster that is operating as a slave in the transfer, that cluster can also be brought out of sleep state if it is asleep during the transfer.

The cluster that is involved in a DMA and can be brought out of sleep after the DMA terminates can determine that it has been brought out of a sleep state based on the code that is executed. A cluster can be brought out of a sleep state based on the arrival of a reset signal and the execution of a reset instruction. The cluster can be brought out of sleep by the arrival of valid data (or control) following the execution of a switch instruction. A processing element or switching element can determine why it was brought out of a sleep state by the context of the code that the element starts to execute. A cluster can be awoken during a DMA operation by the arrival of valid data. The DMA instruction can be executed while the cluster remains asleep and awaits the arrival of valid data. Upon arrival of the valid data, the cluster is woken and the data stored. Accesses to one or more data random access memories (RAMs) can be performed when the processing elements and the switching elements are operating. The accesses to the data RAMs can also be performed while the processing elements and/or switching elements are in a low power sleep state.

In embodiments, the clusters implement multiple processing elements in the form of processor cores, referred to as cores q0, q1, q2, and q3. In embodiments, four cores are used, though any number of cores can be implemented. The instruction 1058 is a processing instruction. The instruction 1058 takes data from the instruction's east input and sends it to a processor q1 for processing. The processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 1000 shown, the circular buffer 1010 rotates instructions in each pipeline stage into switching element 1012 via a forward data path 1022, and also back to a pipeline stage 0 1030 via a feedback data path 1020. Instructions can include switching instructions, storage instructions, and processing instructions, among others. The feedback data path 1020 can allow instructions within the switching element 1012 to be transferred back to the circular buffer. Hence, the instructions 1024 and 1026 in the switching element 1012 can also be transferred back to pipeline stage 0 as the instructions 1050 and 1052. In addition to the instructions depicted on FIG. 10, a no-op instruction can also be inserted into a pipeline stage. In embodiments, a no-op instruction causes execution to not be performed for a given cycle. In effect, the introduction of a no-op instruction can cause a column within the circular buffer 1010 to be skipped in a cycle. In contrast, not skipping an operation indicates that a valid instruction is being pointed to in the circular buffer. A sleep state can be accomplished by not applying a clock to a circuit, performing no processing within a processor, removing a power supply voltage or bringing a power supply to ground, storing information into a non-volatile memory for future use and then removing power applied to the memory, or by similar techniques. A sleep instruction that causes no execution to be performed until a predetermined event occurs which causes the logical element to exit the sleep state can also be explicitly specified. The predetermined event can be the arrival or availability of valid data. The data can be determined to be valid using null convention logic (NCL). In embodiments, only valid data can flow through the switching elements and invalid data points (Xs) are not propagated by instructions.

In some embodiments, the sleep state is exited based on an instruction applied to a switching fabric. The sleep state can, in some embodiments, only be exited by a stimulus external to the logical element and not based on the programming of the logical element. The external stimulus can include an input signal, which in turn can cause a wake up or an interrupt service request to execute on one or more of the logical elements. An example of such a wake-up request can be seen in the instruction 1058, assuming that the processor q1 was previously in a sleep state. In embodiments, when the instruction 1058 takes valid data from the east input and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 1066. In the case of the instruction 1066, data from the processor q1 is moved to the north output. In some embodiments, if Xs have been placed into the processor q1, such as during the instruction 1058, then Xs would be retrieved from the processor q1 during the execution of the instruction 1066 and would be applied to the north output of the instruction 1066.

A collision occurs if multiple instructions route data to a particular port in a given pipeline stage. For example, if instructions 1052 and 1054 are in the same pipeline stage, they will both send data to the east output at the same time, thus causing a collision since neither instruction is part of a time-multiplexed fan-in instruction (such as the instruction 1078). To avoid potential collisions, certain embodiments use preprocessing, such as by a compiler, to arrange the instructions in such a way that there are no collisions when the instructions are loaded into the circular buffer. Thus, the circular buffer 1010 can be statically scheduled in order to prevent data collisions. Thus, in embodiments, the circular buffers are statically scheduled. In embodiments, when the preprocessor detects a data collision, the scheduler changes the order of the instructions to prevent the collision. Alternatively, or additionally, the preprocessor can insert further instructions such as storage instructions (e.g. the instruction 1062), sleep instructions, or no-op instructions, to prevent the collision. Alternatively, or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Returning to DMA, a channel configured as a DMA channel requires a flow control mechanism that is different from regular data channels. A DMA controller can be included in interfaces to master DMA transfer through the processing elements and switching elements. For example, if a read request is made to a channel configured as DMA, the Read transfer is mastered by the DMA controller in the interface. It includes a credit count that calculates the number of records in a transmit (Tx) FIFO that are known to be available. The credit count is initialized based on the size of the Tx FIFO. When a data record is removed from the Tx FIFO, the credit count is increased. If the credit count is positive, and the DMA transfer is not complete, an empty data record can be inserted into a receive (Rx) FIFO. The memory bit is set to indicate that the data record should be populated with data by the source cluster. If the credit count is zero (meaning the Tx FIFO is full), no records are entered into the Rx FIFO. The FIFO to fabric block will ensure that the memory bit is reset to 0, thereby preventing a microDMA controller in the source cluster from sending more data.

Each slave interface manages four interfaces between the FIFOs and the fabric. Each interface can contain up to fifteen data channels. Therefore, a slave should manage read/write queues for up to sixty channels. Each channel can be programmed to be a DMA channel, or a streaming data channel. DMA channels are managed using a DMA protocol. Streaming data channels are expected to maintain their own form of flow control using the status of the Rx FIFOs (obtained using a query mechanism). Read requests to slave interfaces use one of the flow control mechanisms described previously.

Figure 11:
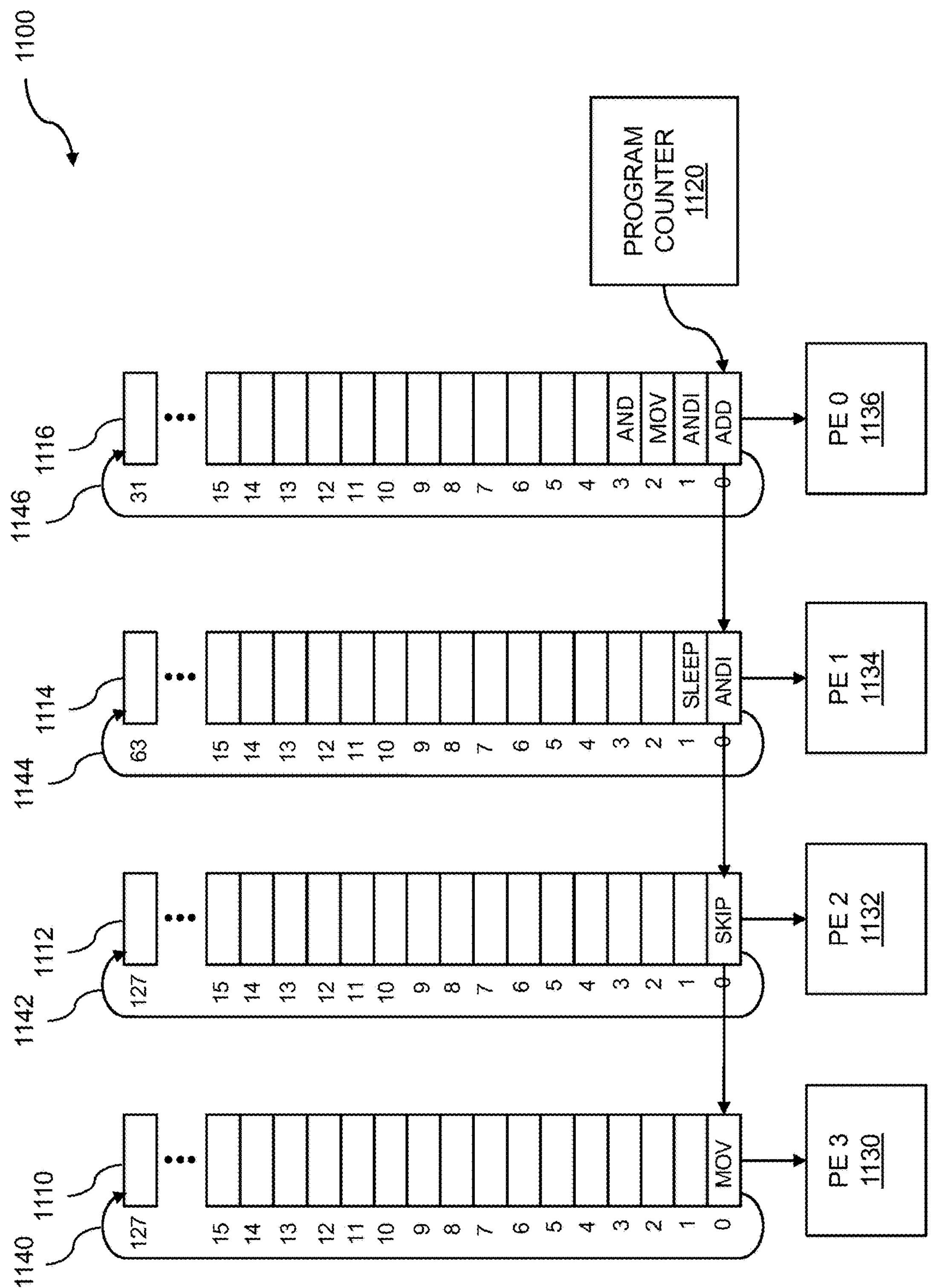
FIG. 11 shows a circular buffer and processing elements.

FIG. 11 shows a circular buffer and processing elements. A diagram 1100 indicates example instruction execution for processing elements. The processing elements can include a portion of or all of the elements within a reconfigurable fabric. The processing elements can execute instructions for data manipulation. The instruction execution can include instructions for an integer matrix multiplication engine using pipelining. A first integer matrix and a second integer matrix are obtained for matrix multiplication, and the first integer matrix and the second integer matrix are distilled into submatrices. A first variable radix point format for the first integer matrix and a second variable radix point format for the second integer matrix are configured. Multiply-accumulate operations are executed in a pipelined fashion on the submatrices of the first integer matrix and the second integer matrix. A third variable radix point format is configured for the result.

A circular buffer 1110 feeds a processing element 1130. A second circular buffer 1112 feeds another processing element 1132. A third circular buffer 1114 feeds another processing element 1134. A fourth circular buffer 1116 feeds another processing element 1136. The four processing elements 1130, 1132, 1134, and 1136 can represent a quad of processing elements. In embodiments, the processing elements 1130, 1132, 1134, and 1136 are controlled by instructions received from the circular buffers 1110, 1112, 1114, and 1116. The circular buffers can be implemented using feedback paths 1140, 1142, 1144, and 1146, respectively. In embodiments, the circular buffer can control the passing of data to a quad of processing elements through switching elements, where each of the quad of processing elements is controlled by four other circular buffers (as shown in the circular buffers 1110, 1112, 1114, and 1116) and where data is passed back through the switching elements from the quad of processing elements where the switching elements are again controlled by the main circular buffer. In embodiments, a program counter 1120 is configured to point to the current instruction within a circular buffer. In embodiments with a configured program counter, the contents of the circular buffer are not shifted or copied to new locations on each instruction cycle. Rather, the program counter 1120 is incremented in each cycle to point to a new location in the circular buffer. The circular buffers 1110, 1112, 1114, and 1116 can contain instructions for the processing elements. The instructions can include, but are not limited to, move instructions, skip instructions, logical AND instructions, logical AND-Invert (e.g. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction and the instruction in the circular buffer can be ignored and the corresponding operation not performed.

In some embodiments, the circular buffers 1110, 1112, 1114, and 1116 could all have the same length, for example, 128 instructions. However, in other embodiments, the plurality of circular buffers can have differing lengths. That is, the plurality of circular buffers can comprise circular buffers of differing sizes. As shown in FIG. 11, the first two circular buffers 1110 and 1112 have a length of 128 instructions, the third circular buffer 1114 has a length of 64 instructions, and the fourth circular buffer 1116 has a length of 32 instructions, but other circular buffer lengths are also possible. The plurality of circular buffers that have differing lengths can resynchronize with a zeroth pipeline stage for each of the plurality of circular buffers. The circular buffers of differing sizes can restart at a same time step. In other embodiments, the plurality of circular buffers includes a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not yet completed its operations. When the second circular buffer reaches completion of its loop of operations, the second circular buffer can restart operations from its beginning.

As can be seen in FIG. 11, different circular buffers can have different instruction sets within them. For example, the first circular buffer 1110 contains a MOV instruction. The second circular buffer 1112 contains a SKIP instruction. The third circular buffer 1114 contains a SLEEP instruction and an ANDI instruction. The fourth circular buffer 1116 contains an AND instruction, a MOVE instruction, an ANDI instruction, and an ADD instruction. The operations performed by the processing elements 1130, 1132, 1134, and 1136 are dynamic and can change over time, based on the instructions loaded into the respective circular buffers. As the circular buffers rotate, new instructions can be executed by the respective processing element.

Figure 12:
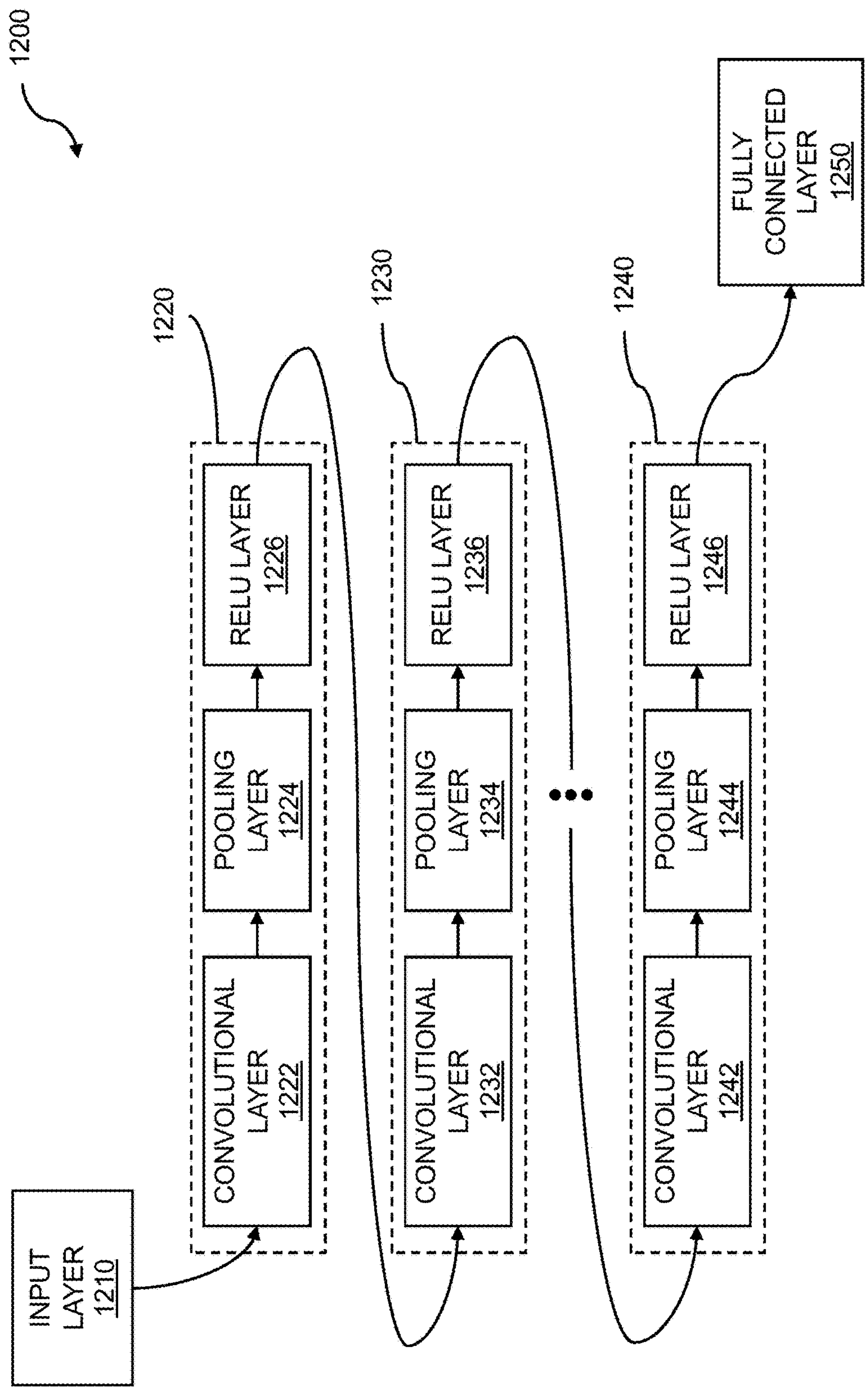
FIG. 12 illustrates a deep learning block diagram.

FIG. 12 illustrates a deep learning block diagram. The deep learning block diagram 1200 can include a neural network such as a deep neural network (DNN), a convolutional neural network (CNN), a recurrent neural network (RNN), and so on. A convolutional neural network or other neural network can be based on layers, where the layers can include input layers, output layers, fully connected layers, convolution layers, pooling layers, max pooling layers, rectified linear unit (ReLU) layers, and so on. The layers of the neural network can include machine learned layers for data manipulation. A neural network can be configured within a reconfigurable fabric. The reconfigurable fabric can include processing elements, switching elements, storage elements, etc. The reconfigurable fabric can be used to perform various operations such as logical operations. Deep learning can support an integer matrix multiplication engine using pipelining. An accelerator element capable of executing software-initiated work requests is accessed. A first integer matrix and a second integer matrix with dimensions are obtained for matrix multiplication within a processor. The matrices employ a two's complement variable radix point data representation. The first integer matrix and the second integer matrix are distilled into submatrices. A first variable radix point format for the first integer matrix and a second variable radix point format for the second integer matrix are configured dynamically. Multiply-accumulate operations are executed in a pipelined fashion on the submatrices. A third variable radix point format is configured for the result.

The deep learning block diagram 1200 can include various layers, where the layers can include an input layer, hidden layers, a fully connected layer, and so on. In some embodiments, the deep learning block diagram can include a classification layer. The input layer 1210 can receive input data, where the input data can include a first obtained data group, a second obtained data group, a third obtained data group, a fourth obtained data group, etc. The obtaining of the data groups can be performed in a first locality, a second locality, a third locality, a fourth locality, and so on, respectively. The input layer can then perform processing such as partitioning obtained data into non-overlapping partitions. The deep learning block diagram 1200, which can represent a network such as a convolutional neural network, can contain a plurality of hidden layers. While three hidden layers, hidden layer 1220, hidden layer 1230, and hidden layer 1240 are shown, other numbers of hidden layers may be present. Each hidden layer can include layers that perform various operations, where the various layers can include a convolutional layer, a pooling layer, and a rectifier layer such as a rectified linear unit (ReLU) layer. Thus, layer 1220 can include convolutional layer 1222, pooling layer 1224, and ReLU layer 1226; layer 1230 can include convolutional layer 1232, pooling layer 1234, and ReLU layer 1236; and layer 1240 can include convolutional layer 1242, pooling layer 1244, and ReLU layer 1246. The convolutional layers 1222, 1232, and 1242 can perform convolutional operations; the pooling layers 1224, 1234, and 1244 can perform pooling operations, including max pooling, such as data down-sampling; and the ReLU layers 1226, 1236, and 1246 can perform rectification operations. A convolutional layer can reduce the amount of data feeding into a fully connected layer. The deep learning block diagram 1200 can include a fully connected layer 1250. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs configured in arrangements such as quads can be coupled to arithmetic units, where the arithmetic units can be coupled to or included in data processing units (DPUs). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0, then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed into configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include offline operations and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence operation of a whole system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 13:
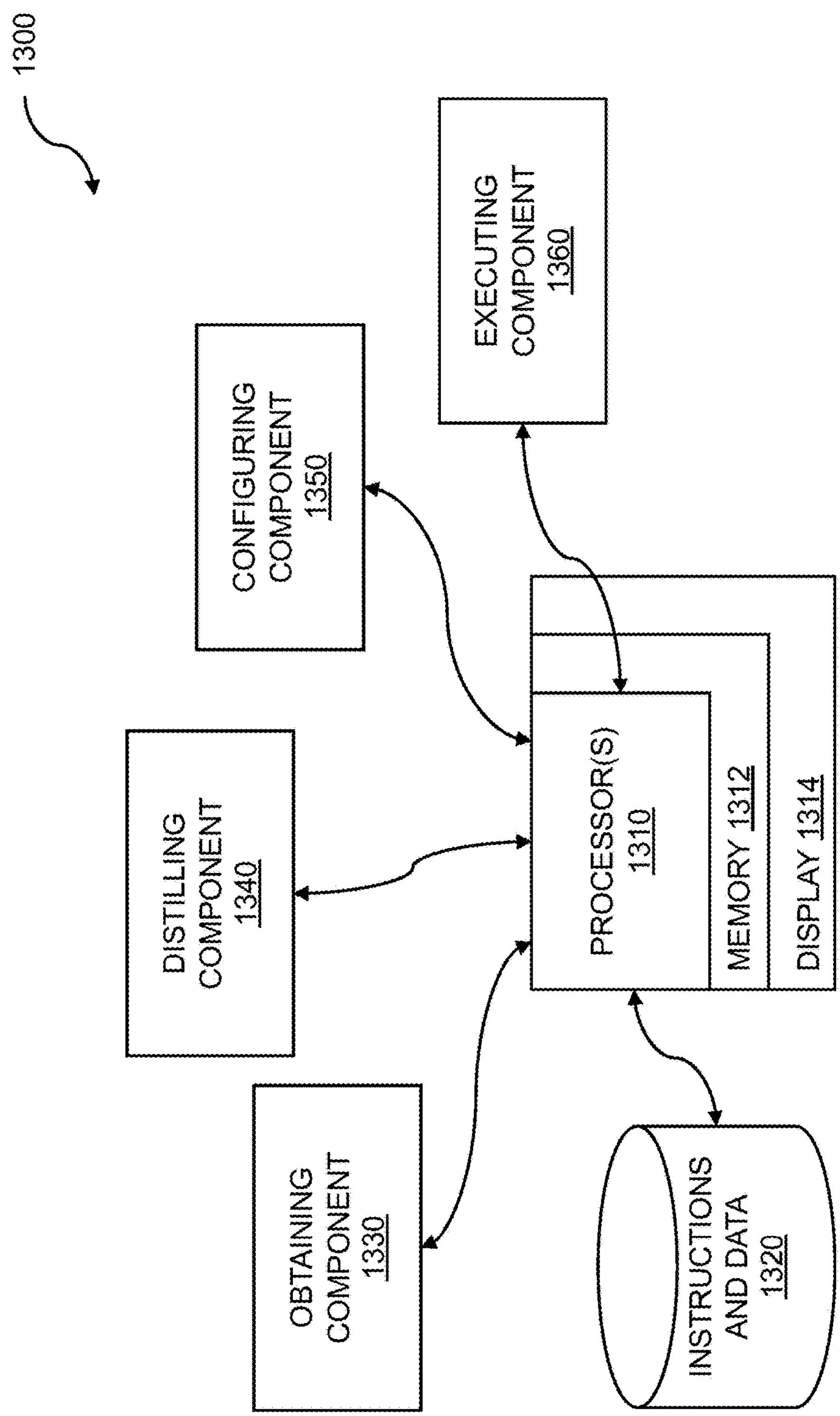
FIG. 13 is a system diagram for data manipulation.

FIG. 13 is a system diagram for data manipulation. Data manipulation is based on an integer matrix multiplication engine using pipelining. The system 1300 can include one or more processors 1310 coupled to a memory 1312 which stores instructions. The system 1300 can include a display 1314 coupled to the one or more processors 1310 for displaying data, intermediate steps, instructions, tensors, results, and so on. In embodiments, one or more processors 1310 are coupled to the memory 1312 where the one or more processors, when executing the instructions which are stored, are configured to: obtain a first integer matrix with dimensions m×k and a second integer matrix with dimensions k×n for matrix multiplication within a processor, wherein the first integer matrix and the second integer matrix employ a two's complement variable radix point data representation; distill the first integer matrix and the second integer matrix into (j×j) submatrices; configure dynamically a first variable radix point format and an initial value for an accumulator register; and execute multiply-accumulate operations in pipelined fashion on the (j×j) submatrices of the first integer matrix and the second integer matrix, wherein a third variable radix point format is configured for the result. The integer matrix multiplication engine is used to multiply matrices of integer values based on a variable radix point numbering format. The variable radix point format includes a 16-bit data type. The integer matrix multiplication operation can be controlled by a dispatch engine, where the dispatch engine can provide hardware resources. The hardware resources can enable scheduling and completion of one or more software-initiated work requests.

The system 1300 can include a collection of instructions and data 1320. The instructions and data 1320 may be stored in storage such as electronic storage coupled to the one or more processors, a database, one or more statically linked libraries, one or more dynamically linked libraries, precompiled headers, source code, flow graphs, kernels, agents, or other suitable formats. The instructions can include instructions for handling integer matrix multiplication. In embodiments, the first variable radix point format and the second variable radix point format comprise a 16-bit data type. Other data types can be used to support different precisions. The other data types, such as data types with fewer bits, can increase processing speed at the cost of reduce accuracy. In further embodiments, the first variable radix point format and the second variable radix point format comprise a 4-bit primitive data type. A 4-bit primitive data type can be stored very densely within one or more storage types. In other embodiments, the first variable radix point format and the second variable radix point format comprise an 8-bit primitive data type. The operation execution, such as integer matrix multiplication operations, can be performed within a reconfigurable fabric. The instructions can include satisfiability solver techniques, machine learning or deep learning techniques, neural network techniques, agents, and the like. The instructions can include constraints, routing maps, or satisfiability models.

The system 1300 can include an obtaining component 1330. The obtaining component 1330 can include functions and instructions for obtaining a first integer matrix with dimensions m×k and a second integer matrix with dimensions k×n for matrix multiplication within a processor, wherein the first integer matrix and the second integer matrix employ a two's complement variable radix point data representation. The first integer matrix and the second integer matrix can include types including a 16-bit data type, an 8-bit primitive data type, a 4-bit primitive data type, and so on. The first matrix and the second matrix can be obtained from storage, where the storage can include one or more storage elements within a reconfigurable fabric. The storage can include direct memory access (DMA) storage, remote DMA (RDMA) storage, and so on. The first integer matrix and the second integer matrix can be obtained by pipelining data extracted from storage. The system 1300 can include a distilling component 1340. The distilling component 1340 can include functions and instructions for distilling the first integer matrix and the second integer matrix into (j×j) submatrices. A matrix, such as the first integer matrix or the second integer matrix, can be partitioned into two or more submatrices. The partitioning of the matrices can enable reduced computational complexity, can enable parallelization of matrix operations, and so on. The partitioning a matrix into submatrices can enable operations such as matrix multiplication to be executed within one or more clusters of processing elements within a reconfigurable fabric. The sizes of the submatrices can be chosen based on storage or processing capabilities, requirements of the precision of the operations, etc. In embodiments, j can be 4. Other sizes of j can be selected. In further embodiments, j can be 8.

The system 1300 can include a configuring component 1350. The configuring component 1350 can include functions and instructions for configuring dynamically both a variable radix point format and an initial value for an accumulator register. The variable radix point format configured for the accumulator register, the first integer matrix, or the second integer matrix can be the same variable radix point format for both matrices and the accumulator, or they can be a different variable radix point format. The variable radix point format or formats can be chosen based on required precision for an integer matrix multiplication operation, storage requirements or storage availability, etc. The configuring component can further configure one or more MAC units. In embodiments, each MAC unit can be configured to have an accumulator depth of m. The configuring can be performed by a dispatch engine. The dispatch engine can provide a set of hardware resources that can enable execution of one or more software-initiated work requests where the work requests can be associated in one or more integer matrix multiplication operations. The configuring can be accomplished using a dispatch engine. The dispatch engine can provide hardware resources for one or more software-initiated work requests, where the software-initiated work requests can be associated with integer matrix multiplication operations. The hardware resources can include elements within a reconfigurable fabric, where the elements within the reconfigurable fabric can include processing elements, switching elements, or storage elements. The hardware resources can include access to DMA storage. In embodiments, the dispatch engine can track readiness of the hardware resources. The readiness of the hardware resources can include availability of the resources, availability of data, and so on. The dispatch engine can provide an interface such as a hardware application programming interface (API). The dispatch engine can receive a request such as a work request. In embodiments, the work request to the dispatch engine comprises a work request descriptor. The dispatch engine can perform other operations.

Described throughout, a work request can include a processing task to be scheduled and executed. A work request can include a work request within a plurality of work requests. In embodiments, the one or more software-initiated work requests can include a data structure that describes an operation performed by one or more hardware elements. An operation can include an arithmetic operation, a vector operation, a tensor operation, a logical operation, and so on. In other embodiments, the one or more software-initiated work requests further comprise a task. A task can include accessing data, processing data, transferring data, storing data, and so on. A task can include a control operation. In further embodiments, the one or more software-initiated work requests can further include a thread within a multi-threaded environment. A thread can include a small sequence of instructions. The system 1300 can include an executing component 1360. The executing component 1360 can include functions and instructions for executing multiply-accumulate operations in a pipelined fashion on the (j×j) submatrices of the first integer matrix and the second integer matrix, wherein a third variable radix point format is configured for the result. The executing can include executing one or more work requests associated with the multiply-accumulate operations. The multiply-accumulate operations can be performed serially, in parallel, using a distributed technique, and so on. In embodiments, executing multiply-accumulate operations in a pipelined fashion can be accomplished using systolic data flow. Systolic data flow can be based on nearest neighbor communication between or among processors. The processors can include processing elements within the reconfigurable fabric, CPUs, GPUs, processors implemented within FPGAs or ASICs, and the like.

The system 1300 can include a computer program product embodied in a non-transitory computer readable medium for data manipulation, the computer program product comprising code which causes one or more processors to perform operations of: obtaining a first integer matrix with dimensions m×k and a second integer matrix with dimensions k×n for matrix multiplication within a processor, wherein the first integer matrix and the second integer matrix employ a two's complement variable radix point data representation; distilling the first integer matrix and the second integer matrix into (j×j) submatrices; configuring dynamically both a variable radix point format and an initial value for an accumulator register; and executing multiply-accumulate operations in a pipelined fashion on the (j×j) submatrices of the first integer matrix and the second integer matrix, wherein a third variable radix point format is configured for the result.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method comprising:

obtaining a first integer matrix with dimensions m×k and a second integer matrix with dimensions k×n for matrix multiplication within a processor, wherein the first integer matrix and the second integer matrix employ a two's complement variable radix point data representation;

distilling the first integer matrix and the second integer matrix into (j×j) submatrices;

configuring dynamically both a variable radix point format and an initial value for an accumulator register;

executing multiply-accumulate (MAC) operations in a pipelined architecture on the (j×j) submatrices of the first integer matrix and the second integer matrix, wherein a third variable radix point format is configured for the result; and using the executed MAC operations to process data in a data-flow architecture.

2. The method of claim 1 further comprising configuring dynamically a first variable radix point format for the first integer matrix and a second variable radix point format for the second integer matrix.

3. The method of claim 2 wherein the first variable radix point format and the second variable radix point format comprise a 16-bit data type.

4. The method of claim 2 wherein the first variable radix point format and the second variable radix point format comprise a 4-bit primitive data type.

5. The method of claim 2 wherein the first variable radix point format and the second variable radix point format comprise an 8-bit primitive data type.

6. The method of claim 1 further comprising outputting results of the matrix multiplication to a storage element, wherein the outputting takes an additional (m×k) cycles.

7. The method of claim 1 wherein the first integer matrix and the second integer matrix comprise subsections of an o-dimensional tensor, wherein o is greater than 2.

8. The method of claim 1 wherein each multiply-accumulate (MAC) unit used for matrix multiplication in the processor is configured to have an accumulator depth of m.

9. The method of claim 1 further comprising pipelining input elements to multiply-accumulate (MAC) units used for matrix multiplication in the processor through two input registers.

10. The method of claim 1 wherein performing N multiply-accumulate (MAC) operations in parallel reduces an amount of time taken to perform the N MAC operations from an order of magnitude of $N^3$ to an order of magnitude of $N^2$.

11. The method of claim 1 further comprising adding one or more idle or no operation (NOP) cycles after completion of a matrix multiply operation before starting a next matrix multiply operation.

12. The method of claim 1 wherein a processor and memory subsystem is allocated as part of one or more clusters within a reconfigurable fabric to implement MAC units.

13. The method of claim 12, wherein each cluster of the one or more clusters within the reconfigurable fabric is controlled by one or more circular buffers.

14. The method of claim 13, wherein the one or more circular buffers are statically scheduled.

15. The method of claim 12, wherein each cluster of the one or more clusters within the reconfigurable fabric comprises process elements, switching elements, or storage elements.

16. The method of claim 1, wherein the data-flow architecture implements machine learning.

17. The method of claim 1, wherein the machine learning utilizes one or more convolutional neural networks.

18. The method of claim 1, wherein executing multiply-accumulate operations in a pipelined architecture is accomplished using systolic data flow.

19. One or more non-transitory computer readable media embodying one or more instructions that are operable when executing by one or more processors to perform operations of:

obtaining a first integer matrix with dimensions m×k and a second integer matrix with dimensions k×n for matrix multiplication within a processor, wherein the first integer matrix and the second integer matrix employ a two's complement variable radix point data representation;

distilling the first integer matrix and the second integer matrix into (j×j) submatrices;

configuring dynamically both a variable radix point format and an initial value for an accumulator register;

executing multiply-accumulate operations in a pipelined architecture—on the (j×j) submatrices of the first integer matrix and the second integer matrix, wherein a third variable radix point format is configured for the result; and using the executed MAC operations to process data in a data-flow architecture.

20. A system comprising: a memory which stores instructions; and one or more processors coupled to the memory wherein the one or more processors, when executing the instructions, are configured to:

obtain a first integer matrix with dimensions m×k and a second integer matrix with dimensions k×n for matrix multiplication within a processor, wherein the first integer matrix and the second integer matrix employ a two's complement variable radix point data representation;

distill the first integer matrix and the second integer matrix into (j×j) submatrices;

configure dynamically both a variable radix point format and an initial value for an accumulator register; and execute multiply-accumulate operations in a pipelined architecture on the (j×j) submatrices of the first integer matrix and the second integer matrix, wherein a third variable radix point format is configured for the result; and use the executed MAC operations to process data in a data-flow architecture.

* * * * *